US011960562B1

(12) United States Patent
Paul

(10) Patent No.: US 11,960,562 B1
(45) Date of Patent: Apr. 16, 2024

(54) CHANNELS OF CONTENT FOR DISPLAY IN AN ONLINE SYSTEM

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/964,671

(22) Filed: Oct. 12, 2022

Related U.S. Application Data

(63) Continuation of application No. 16/402,759, filed on May 3, 2019, now abandoned.

(51) Int. Cl.
*G06F 16/958* (2019.01)
*G06F 16/908* (2019.01)
*G06F 16/9536* (2019.01)
*G06Q 50/00* (2012.01)
*H04L 65/611* (2022.01)

(52) U.S. Cl.
CPC .......... *G06F 16/958* (2019.01); *G06F 16/908* (2019.01); *G06F 16/9536* (2019.01); *G06Q 50/01* (2013.01); *H04L 65/611* (2022.05)

(58) Field of Classification Search
CPC ..... H04L 65/611; G06Q 50/01; G06F 16/958; G06F 16/9536; G06F 16/908
See application file for complete search history.

(56) References Cited

U.S. PATENT DOCUMENTS

| | | | |
|---|---|---|---|
| 8,914,752 B1 * | 12/2014 | Spiegel | G06F 3/0481 715/256 |
| 9,135,311 B2 * | 9/2015 | Decker | G06F 16/9535 |
| 9,690,540 B2 * | 6/2017 | Corbin | G05B 15/02 |
| 9,760,871 B1 * | 9/2017 | Pourfallah | G06Q 10/10 |
| 9,807,049 B2 | 10/2017 | Halliday et al. | |
| 10,528,207 B2 | 1/2020 | Chen et al. | |
| 10,623,917 B1 | 4/2020 | Paul | |
| 11,562,125 B1 * | 1/2023 | Rathus | G06F 16/29 |

(Continued)

OTHER PUBLICATIONS

"Everything you need to know about Snapchat", Jun. 21, 2018, pp. 1-6 (https://web.archive.org/web/20180621194241/https://phys.org/news/2018-06-snapchat.html) (Year: 2018).*

(Continued)

*Primary Examiner* — Scott T Baderman
*Assistant Examiner* — Mario M Velez-Lopez
(74) *Attorney, Agent, or Firm* — Greenberg Traurig, LLC

(57) ABSTRACT

Ephemeral stories allow users of an online system, such as a social networking system, to share content for a predetermined temporary length of time. Channels group and organize stories based on content. Topic-based channels allow contain stories that have related content. Hashtag- and sticker-associated channels contain stories that include particular hashtags or stickers, respectively. User-specific channels contain content tailored by the online system for display to a particular user based on preferences and history. Collaborative channels are channels that are private to a specific group of users. The use of channels improves the online experience by grouping stories by content, thereby facilitating users' interaction with similar content.

20 Claims, 13 Drawing Sheets

(56) References Cited

U.S. PATENT DOCUMENTS

| | | | |
|---|---|---|---|
| 2007/0130164 | A1 | 6/2007 | Kembel et al. |
| 2010/0150437 | A1 | 6/2010 | Morales et al. |
| 2011/0022602 | A1 | 1/2011 | Luo et al. |
| 2011/0239132 | A1 | 9/2011 | Jorasch et al. |
| 2012/0136689 | A1 | 5/2012 | Ickman et al. |
| 2012/0236201 | A1 | 9/2012 | Larsen et al. |
| 2013/0110885 | A1 | 5/2013 | Brundrett, III |
| 2013/0159858 | A1* | 6/2013 | Joffray ............... H04N 21/6587 709/204 |
| 2014/0279068 | A1* | 9/2014 | Systrom ............. G06Q 30/0269 705/14.73 |
| 2014/0280852 | A1 | 9/2014 | Griffiths |
| 2014/0359505 | A1* | 12/2014 | Cisler ................... G06F 16/168 715/810 |
| 2015/0172778 | A1* | 6/2015 | Soon-Shiong ..... H04N 21/4722 725/56 |
| 2015/0326522 | A1 | 11/2015 | Pu et al. |
| 2016/0063117 | A1 | 3/2016 | Carter et al. |
| 2016/0078471 | A1 | 3/2016 | Hamedi |
| 2016/0125916 | A1 | 5/2016 | Mcnally et al. |
| 2016/0182422 | A1 | 6/2016 | Sehn |
| 2016/0247535 | A1 | 8/2016 | Latulipe et al. |
| 2016/0364368 | A1 | 12/2016 | Chen et al. |
| 2017/0039204 | A1 | 2/2017 | Blanchflower et al. |
| 2017/0039528 | A1 | 2/2017 | Becker |
| 2017/0149714 | A1 | 5/2017 | Valdivia et al. |
| 2017/0187772 | A1 | 6/2017 | Paul |
| 2017/0279625 | A1* | 9/2017 | Safa ....................... H04L 67/55 |
| 2018/0268205 | A1 | 9/2018 | Jiang et al. |
| 2019/0034976 | A1 | 1/2019 | Hamedi et al. |
| 2019/0147017 | A1 | 5/2019 | Tran |
| 2019/0166074 | A1* | 5/2019 | Voss ...................... H04L 51/224 |
| 2019/0227989 | A1 | 7/2019 | Keel |
| 2020/0183996 | A1* | 6/2020 | DeLuca ............ G06F 16/90324 |

OTHER PUBLICATIONS

"How to use Instagram Stories like a pro", Aug. 25, 2018 https://web.archive.org/web/20180825193327/https://www.theverge.com/2017/7/1/15889750/instagram-stories-how-to-tips-features-tricks (Year: 2018).*

"How to Utilize Instagram Autocomplete to Find The Perfect Hashtags", Feb. 16, 2017 https://web.archive.org/web/20170216072527/https://www.searchenginejournal.com/utilize-instagram-autocomplete-find-perfect-hashtags/143788/ (Year: 2017).*

Final Office Action dated Aug. 11, 2021 for U.S. Appl. No. 16/402,746, filed May 3, 2019, 13 pages.

Fitzpatrick A., "How to Use Snapchat's New 'Group Stories' Feature," Time.com [Online], May 23, 2017 [Retrieved Oct. 1, 2020], 5 pages, Retrieved from the Internet: URL: https://time.com/4790287/snapchat-group-stories/.

Newton C., "Snapchat Introduces Memories: a Searchable, Shareable Archive of your Snaps," Jul. 6, 2016, 5 pages, retrieved from internet: https://web.archive.org/web/20160706173335/https://www.theverge.com/2016/7/6/12102294/snapchat-memories-private-snap-archive.

Non-Final Office Action dated Apr. 2, 2020 for U.S. Appl. No. 16/402,746, filed May 3, 2019, 11 pages.

Non-Final Office Action dated Feb. 3, 2021 for U.S. Appl. No. 16/402,746, filed May 3, 2019, 13 pages.

Non-Final Office Action dated Dec. 28, 2020 for U.S. Appl. No. 16/402,724, filed May 3, 2019, 13 pages.

Tillman M., "What is Snapchat, How Does it Work and What's the Point?," Pocket-lint.com [Online], Apr. 6, 2020 [Retrieved Oct. 1, 2020], 26 pages, Retrieved from the Internet: URL: https://www.pocket-lint.com/apps/news/snapchat/131313-what-is-snapchat-how-does-it-work-and-what-is-it-used-for.

* cited by examiner

CHANNELS OF CONTENT FOR DISPLAY IN AN ONLINE SYSTEM

CROSS REFERENCE TO RELATED APPLICATIONS

This application is a continuation of co-pending U.S. application Ser. No. 16/402,759, filed May 3, 2019, which is incorporated by reference in its entirety.

FIELD OF ART

This disclosure generally relates to online systems, and more specifically to facilitating user interactions with respect to content of posts by organizing stories into channels.

BACKGROUND

Users of an online system use the online system to share content with one another. In some cases, the content can be presented as a story about a user or a topic, which can include a set of visual content, such as picture, video, text, graphic icons, or a combination thereof posted by a user and can be made available for viewing at the request of other users of the online system. In some cases, the stories may have a limited viewing length and so are only provided to the viewing user for a pre-defined amount of time per view (e.g. play a five-second video or display an image for ten seconds per request to view). Stories may also exist temporarily and may have a pre-determined lifespan during which the story is available for viewing after which the story may expire (e.g. the story may no longer be available for viewing after a 24-hour lifespan).

Conventional stories are organized by author (i.e., the user who posted the story) such that the user can "follow" an author to see the stories or other content that the author posts online within a feed of content provided to the user. Users may also view stories user-by-user or by searching for a particular user to see what that user has posted or to visit the user's profile that includes the user's content. However, users cannot conveniently view in a sequence stories posted by users based around a particular topic, hashtag, or pre-defined group of other users without taking actions to search or navigate among the content of different users.

SUMMARY

An online system allows users to easily communicate with other users of the online system about content and to view a collection of content or stories that are related in some manner in a sequence. The users of the online system create and post stories, and the online system groups the stories into channels, which are collections of stories provided to other users of the online system organized by content and navigable by various factors. Channels allow stories to be viewed by users of the online system based on topic, content, or a set of users, rather than just by the name of the user who created the story, thus improving the content-sharing experience of users of the online system. The channels are similar to television channel in that the user can view a sequence of stories one after another without having to navigate to or conduct a search to find the next story. The user simply views the channel and a sequence of stories that are related in some way (e.g., by being on the same topic, by being posted by a related group of users or by connections of a user in a social networking system, etc.) play on the channel for the user to watch as a continuous stream of content.

In one or more embodiments, stories are added to a channel by the online system based on topic. In a particular embodiment, the online system identifies stories that are "trending" (e.g. popular, or viewed by a high number of users in a short amount of time) and groups them into one or more topic-based channels. For example, a "Music" channel may exist in perpetuity that contains trending stories from various music artists and is updated regularly to contain new content. In another example, a "Super Bowl" channel may exist temporarily that contains stories from the official accounts of the teams playing in the game as well as trending stories from users who may be watching the game live or at home. In some embodiments, the topic-based channels are read-only hubs wherein stories are added to the channels by the online system, not by the users.

In one or more embodiments, the channels are created based on a corresponding sticker or a corresponding hashtag. In one such embodiment, a user creates a story and adds a sticker or a visualization of the hashtag to the visual content before posting. For example, a sticker may exist that is designated "California" that comprises a graphic icon of the state of California and may be attached to a particular location. Similarly, a "California" hashtag may exist that consists of the text "#California" to be included within visual content of a story. The online system creates a channel that comprises the stories posted by various users that include a particular hashtag or sticker. The online system indexes additional stories created with the same sticker or hashtag and automatically adds them to the channel corresponding to the sticker or hashtag. Users of the online system can query and view a channel corresponding to a particular hashtag by searching for the hashtag.

A user can add to a hashtag- or sticker-based channel on-context or off-context. For example, a user can add to a channel on-context when the user is currently viewing a channel and selects to add to the channel with the particular hashtag or sticker. In another example, a user can add to a channel off-context by searching for a hashtag or sticker and adding it to their story on their own. Stickers and hashtags may also be suggested to users when the user creates a story based on trending content, location, or previous usage. Whether or not a story with a particular hashtag or sticker can be viewed on a channel can be determined by the posting user by setting viewing permissions (e.g. public or a specific enumeration of users).

In one or more embodiments, a user of the online system can create a new channel and designate a group of users of the online system as being members of the channel, known as a collaborative channel. A user who is a member of the collaborative channel may be designated as a viewer, meaning the user can only view the collaborative channel. Alternatively, the user may be designated as a collaborator who can both view and add to the collaborative channel. A user can create a new collaborative channel whose members are based on an existing group, such as a messaging group-chat or event-based group. Alternatively, a user can create a new collaborative channel from scratch and search for and designate individual users as viewers or contributors. Users who are contributors to the collaborative channel may add stories to the collaborative channel that can be viewed only by the other members (i.e., not public). The collaborative channel exists for the length of the lifetime of the stories added to the collaborative channel until they have all expired. After expiration, the collaborative channel can be selected to be archived and can be viewed by all members of the collaborative channel at a later date, but collaborators can no longer add to the collaborative channel.

DETAILED DESCRIPTION

Overview

Figure 1:
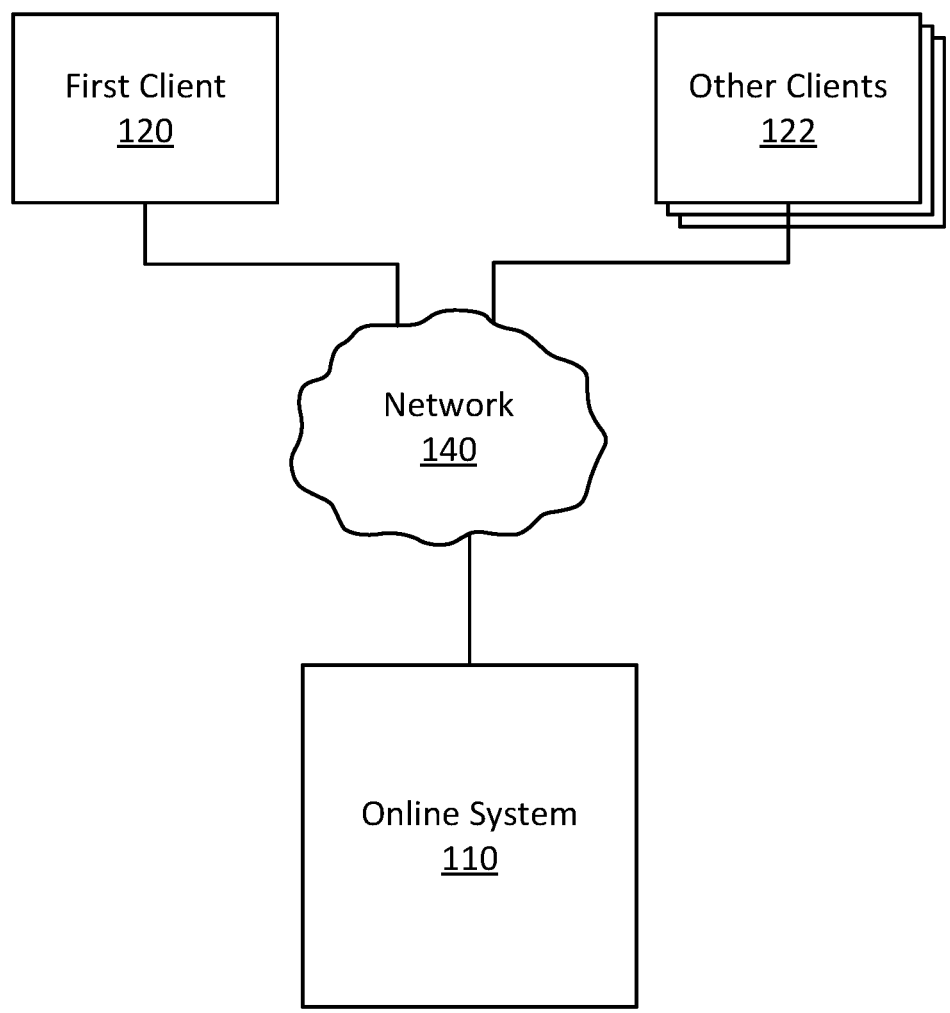
FIG. 1 is a block diagram of a system environment in which a first client, one or more other clients, a network, and an online system operate, in accordance with an embodiment of the invention.

An online system provides a channel that users can view that includes a collection of stories or other content provided to a user one after another, where the stories are grouped in some intelligent manner, such as by topic, by related event, by similar users, by connections of a user in a social networking system, etc. A story or other type of content can be posted on an online system, and can be added to the channel by the user or by the online system. In some cases, stories or other content are ephemeral visual content that can be requested for viewing by a viewing user from a gallery of stories. Each story has an author, who is the user of the online system who created and posted the story.

Conventionally, the gallery of stories is organized by author such that a user can search by author name to find the author's content or can visit an author's profile to view stories posted on the profile. That is, a viewing user can navigate and view stories based on authorship of the stories. Similarly, users can follow an author such that an author's stories will then appear to the user in a newsfeed or other collection of mixed content. However, the present invention organizes the stories into convenient channels that the users can view without having to navigate between stories or conduct searches story-by-story.

The visual content associated with a particular story can include but is not limited to one or more of the following: photo, video, text, graphic icon, animation, location-related icon, mention of another user, drawing. For example, a story may contain multiple photos and a graphic icon layered on top of the photos. The visual content may be created by the user who is posting the story (e.g. take a picture with a camera of a client device) or may be pre-existing content (e.g. user uploads a previously captured image, or user selects a graphic icon provided by the online system). In addition to visual content, a story may include other content, such as audio or music.

A viewing user may request to view a story from an ephemeral gallery of stories or a channel. Responsive to the request, the online system provides the visual content of the story to the viewing user for a pre-determined display time. In some embodiments, the display time is determined by the author at the creation of the story. For example, a user authors a story that comprises a photo as visual content and sets the display time as five seconds. When a viewing user requests to view the story, the online system provides the visual content of the story to display for the pre-determined time (e.g., a photo presented for five seconds) before switching to a next story in the sequence. In another example, a user authors a story that comprises an eight-second-long video as the visual content. When a viewing user requests to view the story, the online system provides the visual content of the story for display by playing the full length of the eight-second video. In some embodiments, the online system sets a maximum display time (e.g. ten seconds). In another embodiment, the online system determines the display time, not the author of the story.

Each story may be associated with a lifespan that generally takes the form of a predefined amount of time during which viewing users can request to view the story. After the expiration of the lifespan of the story, viewing users can no longer request to view the story, although the story may be archived and available for view to the author. For example, an online system may have a predefined lifespan of 24 hours for each story. That is, 24 hours after the creation of a story, the lifespan has expired and the story can no longer be viewed by other users of the online system.

Each story may also be associated with information describing users who have viewed the story. The information may include a total number of users who have viewed the story, a list of users who have previously viewed the story, and the associated account information associated with each user who has previously viewed the story.

A channel is an organized group of stories, played consecutively in response to a request from a viewing user. A channel can contain stories from multiple authors and can be organized and navigable by content. There are various types of channels in different embodiments of the invention. In one embodiment, channels are organized by the topics of the stories. In another embodiment, channels are organized by hashtags and/or stickers that are placed within the visual content of each story in the channel by each story's corresponding author. In another embodiment, a user can create a collaborative channel and invite other users to view and contribute to the story.

A hashtag is a string of text without spaces that begins with a pound symbol, '#', that directs to a collection of other content within an online system that contains the same hashtag. The text of the hashtag may include letters, numbers, and/or symbols. Conventionally, hashtags are not case-sensitive. That is, the text strings "#SuperBowl" and "#superbowl" direct to the same collection of content. In a story, a visualization of the hashtag is displayed as part of the visual content. For example, the text string of the hashtag is overlaid on the other visual content of the story. In some embodiments, the author of a story can select various fonts, colors, and other graphic design to customize the visualization of the hashtag.

A sticker is a graphic icon that can be added to the visual content of a story by the author of the story. A sticker can be animated or contain text. In the context of channels, a sticker can be used to organize stories into channels. That is, stories with the same sticker are organized into a channel associated with the sticker. In some embodiments a sticker is coupled to a corresponding hashtag, wherein a story that contains the sticker is added to the channel of stories containing the corresponding hashtag. The terms "sticker" and "hashtag" may be used interchangeably herein. A story may contain multiple stickers and hashtags.

System Architecture

FIG. 1 is a block diagram of a system environment 100 in which a first client 120, one or more other clients 122, a network 140, and an online system operate 110, in accordance with an embodiment of the invention. The first client 120 and the other clients 122 are connected to one another and the online system 110 via the network 140. In one embodiment, the online system 110 is a social networking system.

The first client 120 and the other clients 122 are computing devices capable of receiving user input as well as transmitting and receiving data via the network 140. In one embodiment, a first client 120 or one of the other clients 122 is a conventional computer system, such as a desktop or laptop computer. Alternatively, a first client 120 or one of the other clients 122 is a device having computer functionality, such as a personal digital assistant (PDA), a mobile telephone, a smartphone, head-mounted display (HMD), virtual reality (VR) or augmented reality (AR) device, or another suitable device.

Both the first client 120 and the other clients 122 are configured to communicate via the network 140. The first client 120 and the other clients 122 may include electronic displays, keyboards, cameras, microphones, speakers, and/or other components that enable users to provide inputs, including text, audio, and visual inputs. These components may also be external devices communicatively coupled to the first client 120 and the other clients 122.

The network 140 includes any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 140 may be encrypted using any suitable technique or techniques.

Figure 2:
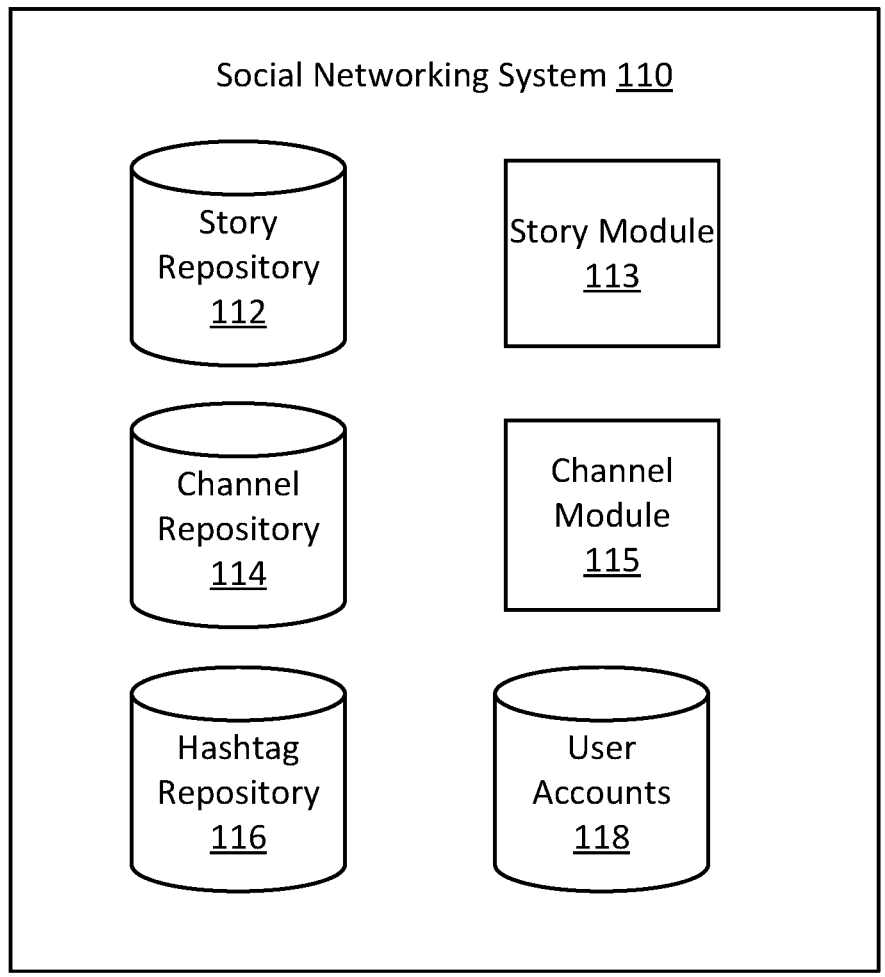
FIG. 2 is a block diagram of an online system, in accordance with an embodiment of the invention.

FIG. 2 is a block diagram of the online system 110, in accordance with an embodiment of the invention. In the embodiment depicted in FIG. 2, the online system 110 comprises a story repository 112, a story module 113, a channel repository 114, a channel module 115, a hashtag repository 116, and a store of user accounts 118.

The story repository 112 stores data associated with the creation and display of stories within the online system 110. In one or more embodiments, story repository 112 stores, for each story, data associated with the user who is the author (e.g. name, account information), the visual content comprised, and time threshold data associated with the story. The time threshold data indicates the lifespan of the story and includes a publishing time (i.e. the time at which the author created or posted the story) and a time threshold that sets the lifespan of the story (e.g. 24 hours). The time threshold data may also include data associated with or derived from the publishing time and time threshold, such as the amount of time passed since the publishing time, the amount of time left until the story expires, and a time at which the story expires.

The story repository 112 also stores data that may be optionally included in the story by the author, in some embodiments. For example, an author of a story may choose to include a hashtag, a sticker, a location tag, a tag of another user of the online system 110, a text string, a drawing, or any combination thereof in the visual content of the story. Accordingly, the story repository 112 would store hashtag data, sticker data, location data, tagged users, and any other data associated with the story. Additionally, the story repository 112 stores any audio data associated with a story, such as audio of a video or a song.

The story repository 112 can also store permission data associated with individual stories. For example, a story may have "public" permissions, meaning any user of the online system 110 or non-user can view the story. A story may alternatively have a more specific list of users of the online system 110 who can view the story.

For each story, the story repository 112 may store viewership data. In some embodiments, viewership data includes a list of users of the online system 110 who have viewed the story. In some embodiments, the viewership data includes a total number of users who have viewed the story and other metrics derived from the views of the story. The viewership data associated with each story can be requested and queried by the author of the respective story.

In some embodiments, the story repository 112 also stores archived stories. Archived stories are stories that have expired and are no longer publicly viewable by other users of the online system 110 but can still be accessed by the story's author. The author can subsequently save the visual content associated with the story, review viewership data and other metrics accumulated during the lifespan of the story, or re-post the story in another form on the online system 110.

The story module 113 processes the creation of new stories by users of the online system 110. In one or more embodiments, the story module takes as inputs a user who is the author of the story, and visual content. The visual content may be one or more photos and or videos. The story module provides the user with options for additional content to add to the visual content, in particular additional visual content. In some embodiments, the additional visual content may include text, drawings, stickers, hashtags, location tags, tags of other users, filters overlaid on top of the visual content including face filters, or any other overlay conventional to those familiar in the art. Other content such as audio content may also be added by the author in addition to the visual content. The author may select one or more, or none, or the additional content to add.

The author may also select permissions to allow certain users of the online system 110 to view the content. Alternatively, the author may passively choose the automatic settings. Permissions can be changed by the author at any time during the lifespan of the story.

The story module 113 takes the data associated with the author, the visual content, and the additional visual and/or other content and creates a new story. The data associated with the story is stored in the story repository 112. The story module 113 determines the time at which the new story is created and stores the information in the story repository 112.

The story module 113 provides stories for view to users of the online system 110. Stories can be queried by authorship. A user can request to view a story, and the story module provides the story for display to the user, given that the user is allowed to view the story based on permissions. When a user views a story, story module 113 saves the data associated with the viewership to the story repository 112.

The channel repository 114 stores data associated with the creation and display of channels within the online system 110. The channel repository 114 stores data associated with the topic associated with each story, such as a trending topic within the online system 110, a particular hashtag or sticker, or a specific group of users of the online system 110. For each channel, the channel repository 114 also stores data associated with the stories comprised within the channel or a mapping to the associated stories within the story repository 112. The channel repository 114 also stores data that specifies or determines the order in which stories are consecutively played within the channel. The channel repository 114 also stores data associated with viewership of the channel.

In one or more embodiments, the channel repository 114 may store a "type" associated with each channel. A channel can be associated with one or more types, each relating to various viewership and/or editorship properties and/or the content associated with the channel. Types associated with channels include, but are not limited to viewership types (such as public, friends-only, and private), content types (such as trending content, user-specific content, hashtag-associated, and sticker-associated), and editorship types (such as read-only, collaborative channel).

A public channel is available for public viewing to users of the online system 110 and, in some embodiments, non-users. A friends-only channel is available for viewing only to a specific subset of users of the online system who are connected to a user who created the channel, or some subset of the user's connections. A private channel is only available for view by the user who created the channel.

A trending content channel contains content that is popular in the online system 110. In some embodiments, trending content channels are further subdivided into topics. Examples of topics of trending content channels may include, music, sports, celebrities, news, etc. A user-specific content channel contains content curated by the channel module 115 specifically for a particular user. In one or more embodiments, user specific content channels are curated by the online system 110 based on user preferences, user viewing history, user activity history, and/or other data comprised about the user in the user accounts 118. An example of a user-specific content channel is "Morning Stories" that is available to a viewing user in the morning and comprises stories posted by various users connected to the viewing user. The "Morning Stories" channel updates daily such that each morning, the viewing user sees new stories and thereby can catch up with the activities of the various connected users in one convenient place.

A hashtag-associated channel is a channel comprising stories associated with a particular hashtag. A sticker-associated channel is a channel comprising stories associated with a particular sticker. The relationship between stories and hashtag-associated/sticker-associated channels may not be one-to-one. That is, a story may contain multiple hashtags and/or stickers and thereby be contained in multiple different channels associated with each hashtag/sticker contained in the story. Additionally, one or more stickers may be associated with a particular hashtag, or vice versa, such that they all contribute to a single channel. For example, in response to wildfires in California, the online system 110 may create a "California Strong" channel. The California Strong channel may have a plurality of hashtags and stickers that map to the channel, such as "#CaliforniaStrong," "#CaliforniaWildfires," "#CaliforniaFires," and stickers that are icons depicting the state of California, etc. The addition of one or more of these hashtags of stickers to a story would add the story with the California Strong channel.

A read-only channel is curated by the online system 110, such as by the channel module 115, and cannot be edited by the users of the online system 110. Both hashtag-associated and sticker-associated channels can be added to by users of the online system 110 by inclusion of a related hashtag or sticker within the content of a story. A collaborative channel can be added to by users who are designated as collaborators of the channel, as is discussed more in relation to FIG. 4.

The channel module 115 processes the creation of new channels and the display of channels within the online system 110, as described in the embodiments that follow.

The hashtag repository 116 stores data associated with hashtags and stickers as well as the associated content within the online system 110. In one embodiment, the hashtag repository 116 contains a mapping of the hashtags used in the online system 110 and the content that contains the respective hashtags, such as stories and channels.

The user account repository 118 stores data associated the users of the online system 110. The user account repository 118 stores account-specific data for each user, such as name, log-in information, demographic information, and other information provided to the online system 110 by the user. The user account repository 118 also maintains data regarding the connections of each user, such as a list of connected users and other connection of followership data, as is known to those familiar in the art. In one or more embodiments, the user account repository 118 may also store data collected about a user by the online system 110, such as interests and activity.

A user uses a client device to access the online system. Each user has one or more client devices, such as the first client 120 or other clients 122 of FIG. 1. As a corollary, a client device that communicates with the online system 110, such as the first client 120 or other clients 122, is associated with a user of the online system 110.

Hashtags for Channels

Figure 3:
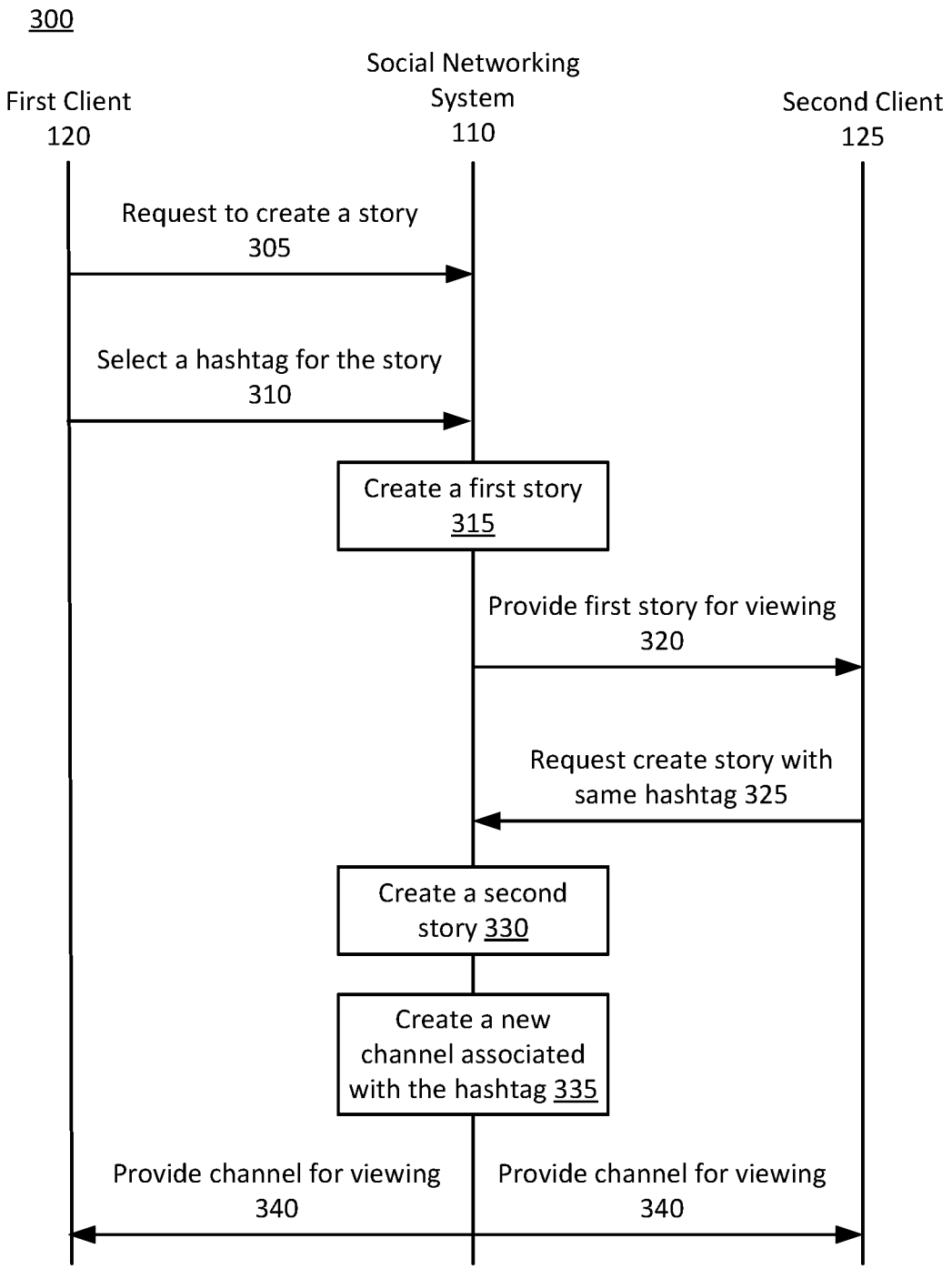
FIG. 3 is a sequence diagram of interactions between a first client, a second client, and an online system to create a channel with a hashtag, in accordance with an embodiment of the invention.

FIG. 3 is a sequence diagram of interactions between a first client 120, a second client 125, and an online system 110 to create a channel with a hashtag, in accordance with an embodiment of the invention. In one or more embodiments, the processing performed by the online system 110 is performed by the channel module 115. In a preferred embodiment, the first client 120 is associated with a first user of the online system 110 and the second client 125 is associated with a second user of the online system.

The first user uses the first client 120 to request 305 to create a story. The request 305 is sent from the first client 120 to the online system 110. In a preferred embodiment, the request 305 takes the form of the first user interacting with an interface of the online system 110 displayed on the first client 120 and selecting an element to indicate the desire to create a new story, such as interacting with a camera of the first client or otherwise uploading visual content to the online system 110. The upload, creation, or otherwise addition of visual content to the online system can be considered the request 305 to create a new story within the online system 110.

The online system 110 provides an interface allowing the first user to edit the visual content. In one embodiment, the edits to the visual content include the addition of other content, including additional visual content, as previously described in ¶40. For example, a user may upload a photo as visual content and add a filter and text to the photo using the interface provided by the online system 110.

In the process of creating the new story, the user can select 310 a hashtag for the story. A hashtag can be selected 310 for addition to the story based on suggested hashtags provided by the online system 110 or can be added by text, or a combination thereof wherein the user begins typing text and the online system 110 suggests hashtags. The various methods for selecting 310 a hashtag to add to a story are discussed in more detail in relation to FIGS. 11A-11D.

The methods of selecting 310 a hashtag for inclusion to the story also apply to stickers. That is, the first user can select a sticker based on suggested stickers or a text query. The first user can select 310 one or more hashtags and stickers for inclusion with the story. The first user's selection 310 is sent from the first client 120 to the online system 110.

The online system 110 creates 315 the first story. In one embodiment, the creation 315 of the first story is performed by the story module 113 within the online system 110. The first story comprises the visual content and the selected hashtag and associates the first user as its author. The first story is stored in the story repository 112.

In one embodiment, the second user requests to view the first story via the second client 125. For example, the first user and the second user may be connected within the online system 110 and the second user may request to view the story associated with the first user via the interface of the online system 110 via an interface. Conventionally, stories are organized by author. The second user may have queried the first story by searching for the first user.

The online system 110 provides 320 the first story for viewing to the second client 125. The online system 110 may provide 320 the first story in response to a request from the second client 125 to view the story, such as the requests described in the preceding paragraph. Alternatively, the first story may be provided 320 subsequent to a preceding story. The preceding story may be another story of the first user or a story of a different user. Hence, the first story may be provided 320 to the second client 125 responsive to an active request or other event or alternatively provided 320 passively.

When the first story is provided 320 by the online system 110 to the second client 125, the second client 125 provides the first story to the second user using a display. In one embodiment, the online system 110 provides an interface for interacting with the first story along with providing 320 the first story. The second user may interact with the first story via the second client 125. In particular, the user may interact with the hashtag displayed on the visual content of the first story. Examples of such interactions include, selecting, clicking, tapping, or otherwise directly interacting with the display of the hashtag. Such an interaction provides the second user with an option to create their own story with the hashtag. A particular example of this interaction is discussed in relation to FIG. 10C.

The second user via the second client 125 requests 325 to create a new story with the same hashtag. The second user via the second client uploads, provides, or otherwise adds visual content for addition to the new story. The second user may edit the visual content or add additional content. In one or more embodiments, the same hashtag is automatically provided on the visual content, but may be visually edited by the second user (e.g. moved, re-sized, change font, change color, or otherwise change format).

The online system 110 creates 330 a second story. In one embodiment, the creation 330 of the second story is performed by the story module 113 within the online system 110. The second story comprises the visual content from the second user and the hashtag and associates the second user as its author. The second story is stored in the story repository 112.

The first story and the second story are both associated with the same hashtag. Conventionally, the first story and the second story could only be queried or viewed by authorship. That is, in order to view both the first story and the second story, a user would have to independently view the first user's first story and the second user's second story.

The online system 110 creates 335 a channel associated with the hashtag. In one embodiment, the channel is created by the channel module 115 and stored in the channel repository 114. The channel comprises the first story and the second story. A user of the online system 110 can view the first story and the second story consecutively and conveniently using the channel. In one embodiment, the online system 110 provides 340 the channel for viewing to the first client 120 and the second client 125. The online system 110 may also provide the channel for viewing to other users, such as the other clients 122 of FIG. 1.

In some embodiments, the online system 110 provides 335 the channel in response to a request to view the channel. The request may come from an interaction via a client device with an interface presented for display by the online system 110. Examples of such interfaces are discussed in greater detail in relation to FIGS. 6-9. A user can also search for a channel by title of hashtag via a text search within the online system 110. The various methods provided for viewing a channel improve the user experience by allowing viewer to request and view relevant content more conveniently than conventional methods of viewing solely by authorship.

When a channel is provided for display, the various stories from various authors are displayed in a particular order. The method behind determining the order varies in different embodiments. For example, in an embodiment of a chronological display, the first story is provided for display preceding the second story within the hashtag channel because the first story was created prior to the second story. In another example, the second story has received more views overall than the first story. In a popularity-based embodiment, the second story is provided for display preceding the first story in the hashtag channel because the second story has more views overall and is therefore more popular within the online system 110.

In some embodiments, viewability permissions may vary across the stories added to the hashtag channel. The viewability permissions are set by the author and can be changed at any time during the lifespan of a story, as discussed in ¶41. For example, the first user may set the permissions of the first story as "public" meaning any user or non-user can view the story. The second user may set the permissions of the second story as "friends-only" meaning only the connections of the second user (or some specified subset thereof) can view the second story. Hence, while both stories are within the channel, not all users can view all of the stories within the channel. That is, a user who is connected to the second user can view both the first story and the second story on the channel. However, a user that is not connected to the second user can view the first story but not the second story when viewing the channel.

The foregoing description of the hashtag-associated channel applies equally to a sticker-associated channel.

Collaborative Channels

Figure 4:
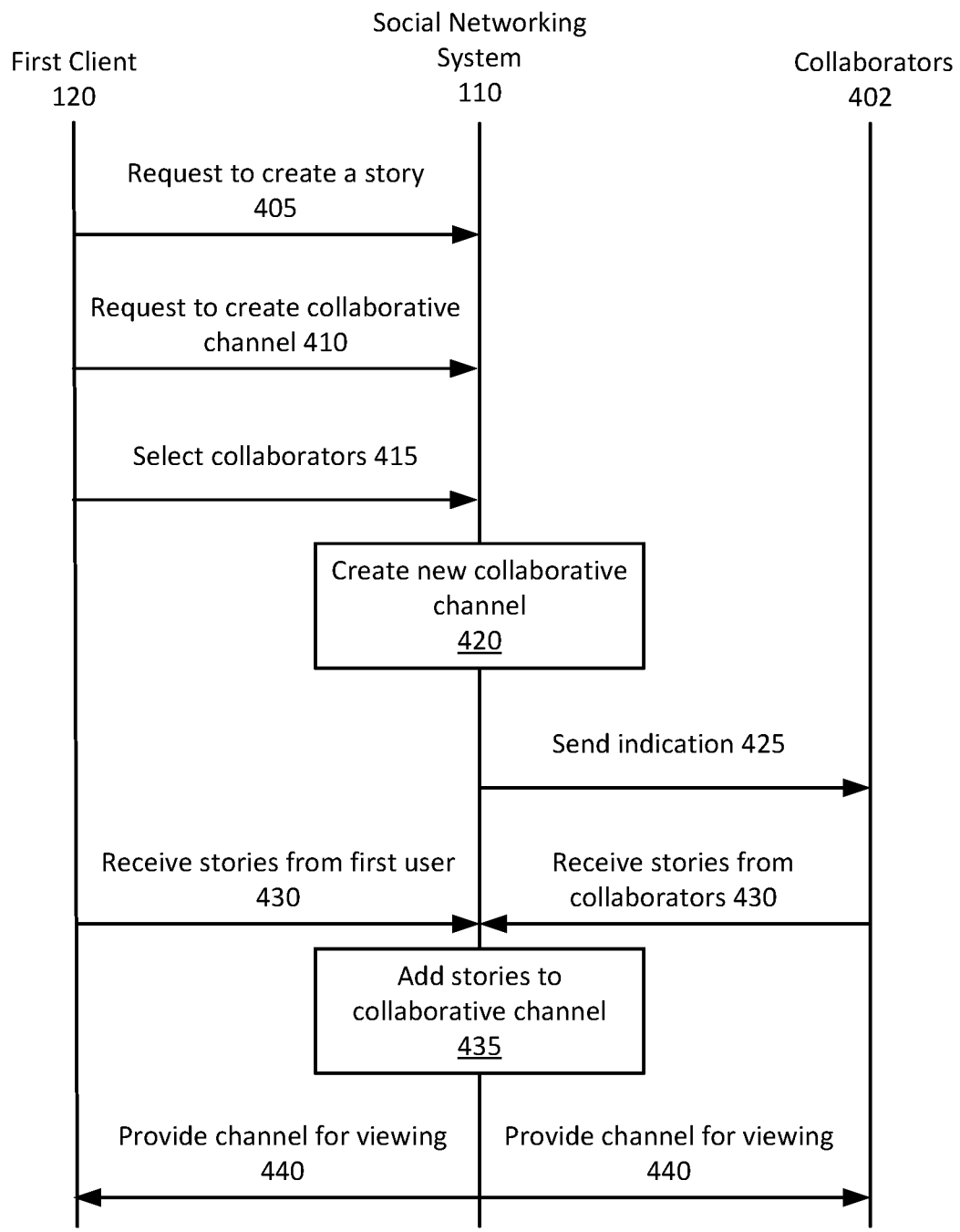
FIG. 4 is a sequence diagram of interactions between a first client, one or more collaborators, and an online system to create a collaborative channel, in accordance with an embodiment of the invention.

FIG. 4 is a sequence diagram of interactions between a first client 120, one or more collaborators 402, and an online system 110 to create a collaborative channel, in accordance with an embodiment of the invention. In one or more embodiments, the processing performed by the online system 110 is performed by the channel module 115. In a preferred embodiment, the first client 120 is associated with a first user of the online system 110 and the collaborators 402 are one or more users of the online system operating on one or more client devices. The one or more client devices associated with the collaborators 402 may be the other clients 122 of FIG. 1.

The first user uses the first client 120 to request 405 to create a story 405. The request 405 is sent from the first client 120 to the online system 110. In a preferred embodiment, the request 405 takes the form of the first user interacting with an interface of the online system 110 displayed on the first client 120 and selecting an element to indicate the desire to create a new story, such as using a camera of the first client or otherwise uploading visual content to the online system 110. The upload, creation, or otherwise addition of visual content to the online system can be considered the request 405 to create a new story within the online system 110.

The online system 110 provides an interface allowing the first user to edit the visual content. In one embodiment, the edits to the visual content include the addition of other content, including additional visual content, as previously described in ¶40. For example, a user may upload a photo as visual content and add a filter and text to the photo using the interface provided by the online system 110.

The first user uses the first client 120 to request 410 to create a collaborative channel. The request 410 is sent from the first client 120 to the online system 110. In a preferred embodiment, the online system 110 provides an interface to the first client 120 with an option via the interface to create a collaborative channel. In some embodiments, the first user does not need to request 405 to create a story. For example, the user can request 410 to create a collaborative channel from a different means, such as from an existing group of users, such as an event group or a message group within the online system 110. In some embodiments, the first user can request 410 to create a collaborative channel from a third-party system that is connected to the online system 110.

The first user uses the first client 120 to select 415 collaborators. The collaborators are users of the online system 110, such as those whose information is stored in the user accounts 118. The first user selects one or more users, who can be users with whom they are connected within the online system 110 (e.g., "friends"), or users with whom the first user is not connected with. The selection 415 can take the form of searching for individuals (e.g. by name or other credentials), selecting users that are suggested by the online system 110, selecting users from an existing group (i.e. a message or chat group, an event group, a group connected to an organization, etc.), or any combination thereof. The selection 415 is sent from the first client 120 to the online system 110.

In an optional embodiment, the first user can select viewers in addition to collaborators. As described in ¶9, users who are collaborators can both view and add content to the channel whereas viewers can only view the channel. Additionally, the first user can add additional collaborators or viewers at any time, including after the new collaborative channel is created 420. Collectively, the first user, collaborators, and viewers are referred to as the members of the channel. Any user of the online system who is not a member of a particular collaborative channel cannot view the particular collaborative channel.

The online system 110 creates 420 a new collaborative channel. In one embodiment, the creation 420 of the collaborative channel is done by the channel module 115 and the collaborative channel is stored in the channel repository 114. The collaborative channel is based on the inputs sent from the first client 120. The collaborators 402 are the users who were selected 415 as collaborators. The online system 110 sends 425 and indication to each collaborator. In a preferred embodiment, the sent 425 indication comprises the information that the collaborative channel has been created and that the receiving user has been designated a collaborator. Similarly, an indication may be sent to any users who are designated as viewers that the collaborative channel has been created and the receiving user has been designated a viewer.

In some embodiments, before, during, or after the creation 420 of the collaborative channel, a user who is a member of the channel can create a name for the collaborative channel and/or set an icon to represent the collaborative channel. In some embodiments, the first user sets the name and/or icon. In other embodiments, the collaborators 402 have permissions to set the name and/or icon. In some embodiments, the name and/or icon can be added or changed at a later time by one of the members of the collaborative channel.

The first client 120 and the collaborators 402 can create stories and have the option to add the stories to the collaborative channel. The online system 110 receives 430 one or more stories from the first client 120 and/or the collaborators 402. Users who are designated as viewers of the collaborative channel cannot add stories to the collaborative channel. When creating a story, users who are collaborators 402 or the first user are provided with an option by the online system 110 to add the story to the collaborative channel. For example, during or after a user adds additional content to the visual content of a new story, the online system 110 provides the user with an option or indication to add the story to the collaborative channel. Unlike the hashtag-associated or sticker-associated channels, users who add stories to the collaborative channel are not required to add a particular sticker or hashtag to their stories in order to add the story to the collaborative channel. However, the user can optionally add a hashtag or sticker or any other previously described additional content to the story before adding to the collaborative channel. In addition to adding a new story to the collaborative channel, a user may also add the same new story to their personal story or another channel.

After receiving 430 stories, the online system 110 adds 435 the received one or more stories to the collaborative channel. The addition of the received one or more stories to the collaborative channel may be performed by the channel module 115 in any of the methods described herein.

After the received stories are added 435, the channel comprising the stories is provided 440 for viewing to the members of the collaborative channel, such as the first user of the first client 120 and the collaborators 402 on other clients 122. In a preferred embodiment, a user requests the channel for viewing via a client device and the online system 110 provides 440 the collaborative channel to the client device for display. A user can request to view the collaborative channel by interacting with an interface provided by the online system 110 on a client device.

When provided 440 for viewing, stories comprised within the channel may be ordered in a variety of ways in variety of embodiments, such as those described in ¶68. In one embodiment, a user can manually set the method for ordering stories within the collaborative channel. For example, when creating the collaborative channel 420, the first user may set the display settings such that the stories within the collaborative channel are displayed chronologically.

In one example of this embodiment, a group of friends creates a collaborative channel for their group vacation to Tokyo to conveniently share stories from the trip. A first user creates a collaborative channel and invites all the friends attending the trip to be collaborators on the collaborative channel, which the first user names "Tokyo Times." In particular, the Tokyo Times channel may be created from an existing messaging group. Subsequently, the users who are designated collaborators in Tokyo Times, including the first user, can add stories to the channel. This provides an easy way for the group to share their adventures with one another as they travel through Tokyo.

Stories added to the Tokyo Times channel are only available for viewing by the friends who are part of the channel. As the friends add stories to the Tokyo Times channel, they can optionally also add the stories to their personal story or other public channels.

Additionally, stories added to Tokyo Times remain available for viewing via the channel for on the basis of the lifespan of most-recently-added story to the channel. For example, stories have a lifespan of 24 hours. A user adds the same story to the Tokyo Times channel and their personal story. The story will expire on the personal story after 24 hours. However, the story will remain available for viewing on the Tokyo Times channel for as long as the 24-hour lifespan has not expired for the most recent story in the channel. In other words, every time a new story is added to Tokyo Times, the lifespan of each story in the channel is extended by 24 hours. This allows the friends to continuously share and view their adventures throughout the trip without concern that the content will expire before the end of the trip. In one embodiment, the lifespan settings of the stories within the channel may also be manually changed by users of the channel.

In practice, if the friends continue adding stories to Tokyo Times until the end of the vacation, the stories in the channel will continue to be available for viewing to the members of Tokyo Times. After, the lifespan of the most-recently-added story expired, the channel becomes archived. That is, all of the stories shared to the Tokyo Times channel can be accessed by the users who were in the channel in their archived content on the online system 110. Once the Tokyo Times channel is archived, the users can no longer add stories to the channel, only view the existing archived content. This provides the users with a convenient way to look back on the memories from their trip.

Topic-Based Channels

Figure 5:
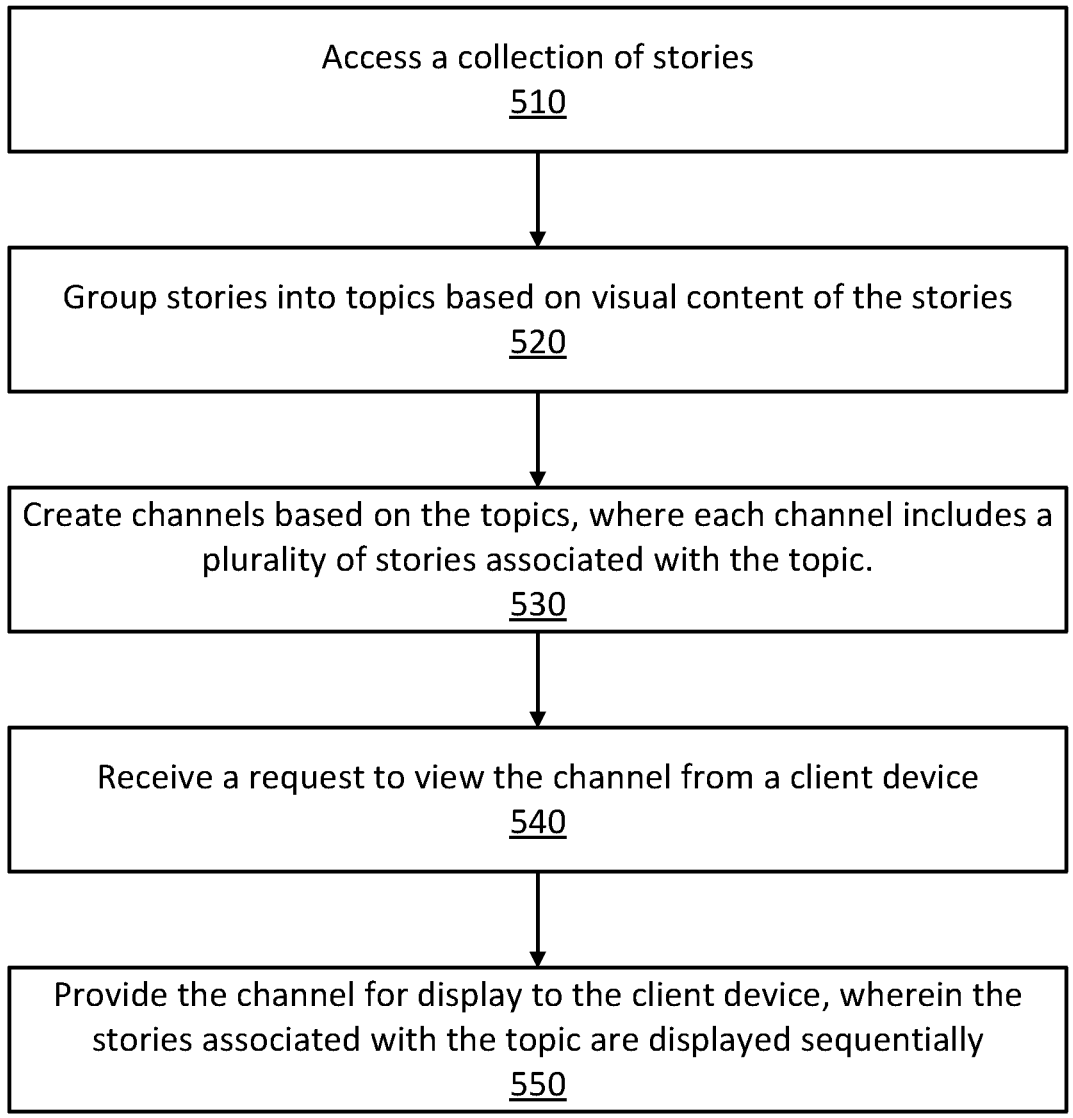
FIG. 5 is a flowchart illustrating a process for an online system to create a topic-based channel, in accordance with an embodiment of the invention.

FIG. 5 is a flowchart illustrating a process 500 for an online system 110 to create a topic-based channel, in accordance with an embodiment of the invention. In one or more embodiments, the process 500 is executed by the channel module 115 of the online system 110.

The online system 110 accesses 510 a collection of stories. In one embodiment, the online system 110 accesses 510 a story repository 112 that contains stories posted to the online system 110 by various users. In particular, the online system 110 accesses 510 stories in the story repository with public privacy settings.

The online system 110 groups 520 the stories based on the visual content of the stories. In one embodiment, the online system may infer the visual content of the story based on one or more specific categories associated with the author of the story. For example, a channel associated with the topic of "Sports" can contain stories with authors who are known to be associated with sports-related content, such as the official account of the professional football team the Philadelphia Eagles. For example, stories posted by the Philadelphia Eagles official account would inherently have visual content related to the topic of "Sports" and therefore be relevant for inclusion in the Sports channel. The story does not need to have a related hashtag such as "#Sports" or "#SuperBowl2019" to be grouped to the Sports channel. The channel contains stories from a plurality of authors with visual content relating to the topic. In the Sports channel example, the channel could also contain stories authored by the Golden State Warriors and the Philadelphia Flyer's mascot Gritty. Therefore, a viewing user is motivated to view the channel based on the topic rather than particular authors. Additionally, by viewing a topic-based channel, a viewing user can discover new users who were the authors of various stories in the channel to connect with or follow.

In one or more embodiments, the online system 110 uses computer vision and machine learning to identify objects in the visual content and thereby categorize and group stories by topic. For example, the online system 110 may use computer vision to recognize a round orange object as a basketball and thereby associate the story with the Sports topic-based channel. The online system 110 may use a variety of other factors to identify topics associated with stories, such as text added to the visual content, location tags, and/or tags of other users. For example, a user may tag a story with a location at Lincoln Financial Field and the online system 110 associates that location tag with the Sports topic-based channel. Similarly, a story that contains a tag to the Philadelphia Eagles account would be grouped to the Sports topic-based channel. The online system 110 may also associate or map text phrases to specific topic-based channels. For example, a story that contains text with the popular Eagles' chant, "Fly Eagles Fly" would be grouped by the online system 110 to the Sports topic-based channel.

In one or more embodiments, the online system 110 groups 520 stories by other factors, in addition to or in lieu of the visual content. In particular, the online system 110 may take into consideration authorship and viewership data when grouping 520 stories. For example, the online system 110 may consider viewership data such as number of views to determine the virality of a story. The online system 110 may also consider the authorship data, as can be accessed from the user accounts 118. For example, whether or not a user is a verified user or has a large following on the online system 110 can be considered in a determination of virality.

The online system 110 creates 350 channels based on the topics, where each channel includes a plurality of stories associated with the topic. The grouped 520 stories are turned into channels when the groupings satisfy particular criteria. For example, the online system 110 may set a threshold number of stories needed for a grouping of stories to become a channel.

The online system 110 receives 540 a request to view the channel from a client device. The client device may be the first client 120 or other clients 122 of FIG. 1. The request 540 may be received via an interface provided for display on the client device.

The online system 110 provides 550 the channel for display to the client device, wherein stories associated with the topic are displayed sequentially. That is, the stories are provided for display one after another such that the next story in the sequence is provided for display immediately after the preceding story. As the stories of the channel are provided for display on the client device, the user of the client device may interact with the channel or individual stories via an interface. Examples of such interactions are described in greater detail with respect to FIG. 10A.

One embodiment of the topic-based channel may include a plurality of channels with pre-determined topics. Stories are added to the pre-determined topic channels based on what is trending, popular, or otherwise relevant to particular users. One example is a "Music" channel that comprises popular and important stories from the music industry. For example, the Music channel might include a story from Taylor Swift's personal story, stories wherein a user is listening to and enjoying Ariana Grande's newly released album, a story announcing a new collaboration between two popular artists, and other stories relevant to the music industry. The channel is updated regularly to include new and relevant content. Other such channels may exist for sports, fashion, food, news, comedy, celebrities, etc. Channels may be presented to a particular user based on the user's interest or history interacting with other content. For example, if a user has a history of interacting with sport-related content then the sports topic-based channel may be presented to the user in a more prominent way than other less-relevant channels.

Another example of topic-based channel are user-specific topic based channels. That is, the online system 110 curates content into one or more topic-based channels for a particular user. The online system 110 may use information stored in the user accounts 118, such as connections to other users and historical data, to determine relevant topics and curate content. One example of such a user-specific channel is "Morning Stories", which contains a roundup of stories from users connected to a particular user on the online system 110 that is updated every morning. The online system 110 determines what stories to add to a Morning Stories channel of a particular user based on the subset of users of the online system 110 that are connected to the particular user. The online system 110 further determines what stories to add to the "Morning Stories" channel based on the time at which the channels were posted (e.g. stories posted in the morning). Additionally, the stories may be ordered within the channel to be presented to the particular user based on the relevance to the particular user. For example, the online system 110 may order the stories within the Morning Stories channel such that stories authored by users who are more closely connected to the particular user are displayed first. By curating the content daily and providing it for display to a user, the user can quickly and conveniently catch up with what their friends are doing that day, thereby improving the social networking experience.

Another example of the user-specific topic based channels is "Eating Out", which comprises stories of a particular user's connections dining out. In one embodiment, the online system 110 may use computer vision and other artificial intelligence to recognize visual content of food and/or beverages. The online system 110 may use other content comprised in the story to determine if it is dining-related, such as a location tag at a business that is known to be a restaurant as well as stickers or hashtags associated with eating and drinking. The online system groups 520 these dining-related stories into the Eating Out channel. Like Morning Stories, the Eating Out channel may order stories as to present more relevant stories first. This allows a user to view what restaurants are popular among their friends as well as what restaurants are popular in their city/neighborhood, thereby improving their online experience.

In many embodiments, the topic based stories are "read-only hubs", meaning that they are created and maintained by the online system. Users can view the content in read-only hubs but cannot contribute their own content.

Example Interfaces

Figure 6:
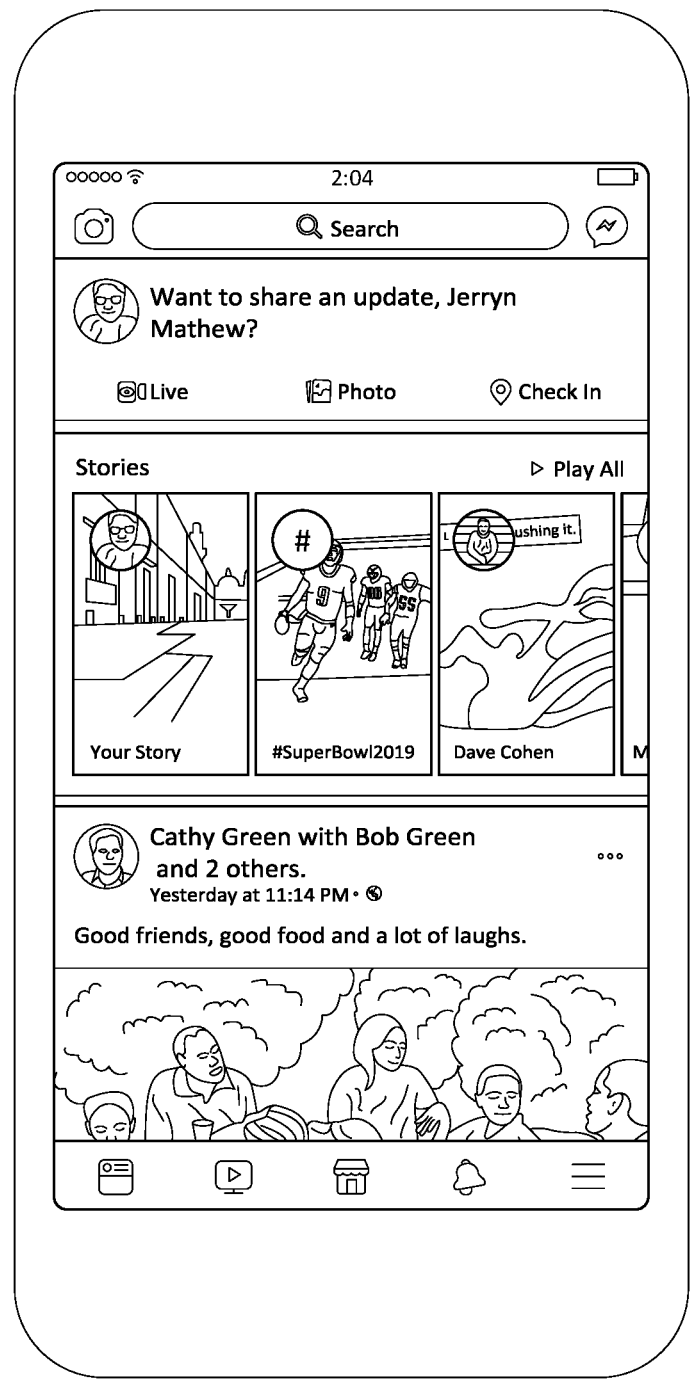
FIG. 6 shows an example user interface, presented to a user by the online system, from which the user can select a channel to view from a story tray, in accordance with an embodiment of the invention.

FIG. 6 shows an example user interface, presented to a user by the online system 110, from which the user can select a channel to view from a story tray, in accordance with an embodiment of the invention. The user can select the channel in the story tray (e.g. click, tap, interact with) and the online system 110 will provide the channel for display to the user.

Figure 7:
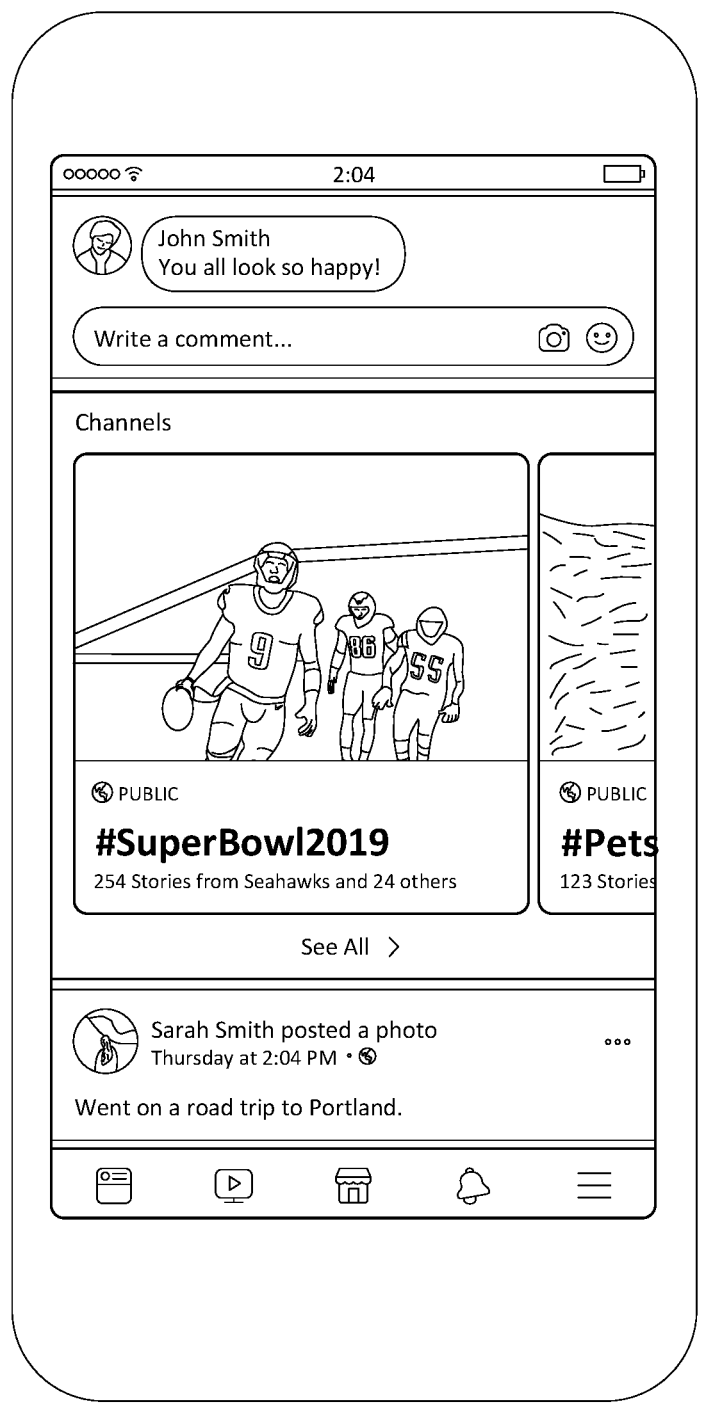
FIG. 7 shows an example user interface, presented to a user by the online system, from which the user can select a channel to view from an in-feed unit, in accordance with an embodiment of the invention.

FIG. 7 shows an example user interface, presented to a user by the online system 110, from which the user can select a channel to view from an in-feed unit, in accordance with an embodiment of the invention. The user can select the channel in the in-feed unit (e.g. click, tap, interact with) and the online system 110 will provide the channel for display to the user.

Figure 8:
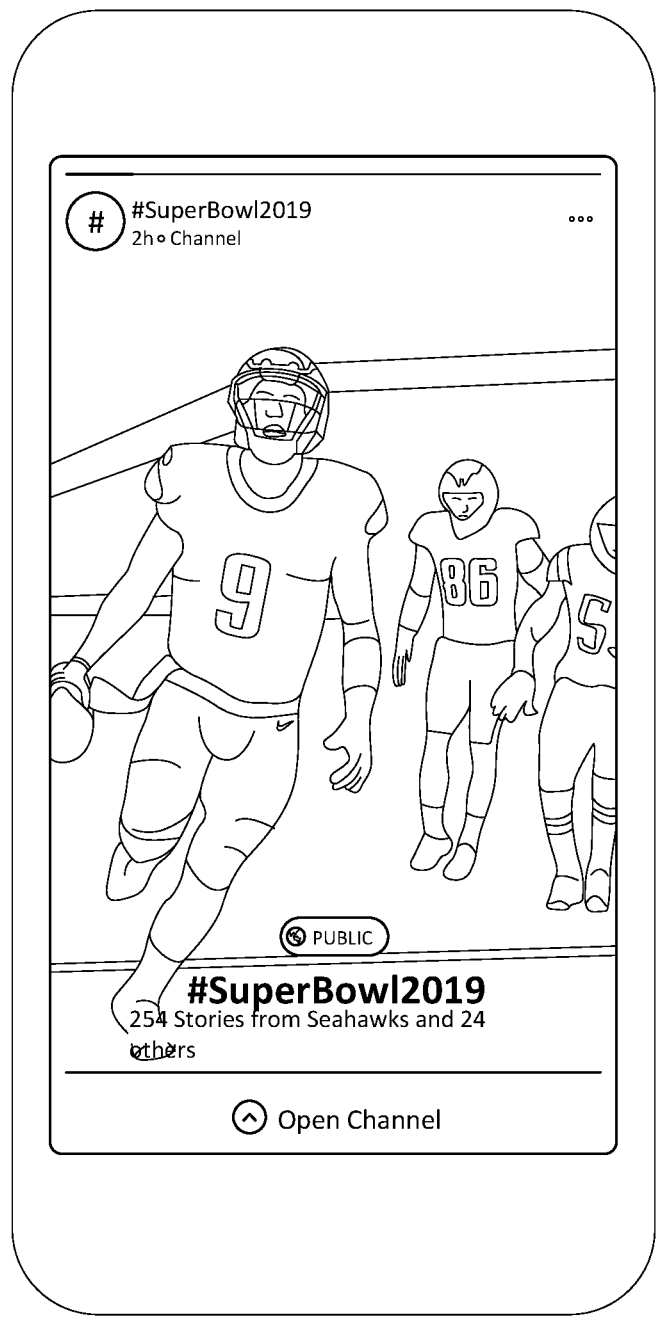
FIG. 8 shows an example user interface, presented to a user by the online system, from which the user can request to view a channel to view from a channel player, in accordance with an embodiment of the invention.

FIG. 8 shows an example user interface, presented to a user by the online system 110, from which the user can request to view a channel to view from a channel player, in accordance with an embodiment of the invention. The user can select the "Open Channel" (e.g. click, tap, interact with, swipe up) and the online system 110 will provide the channel for display to the user.

Figure 9:
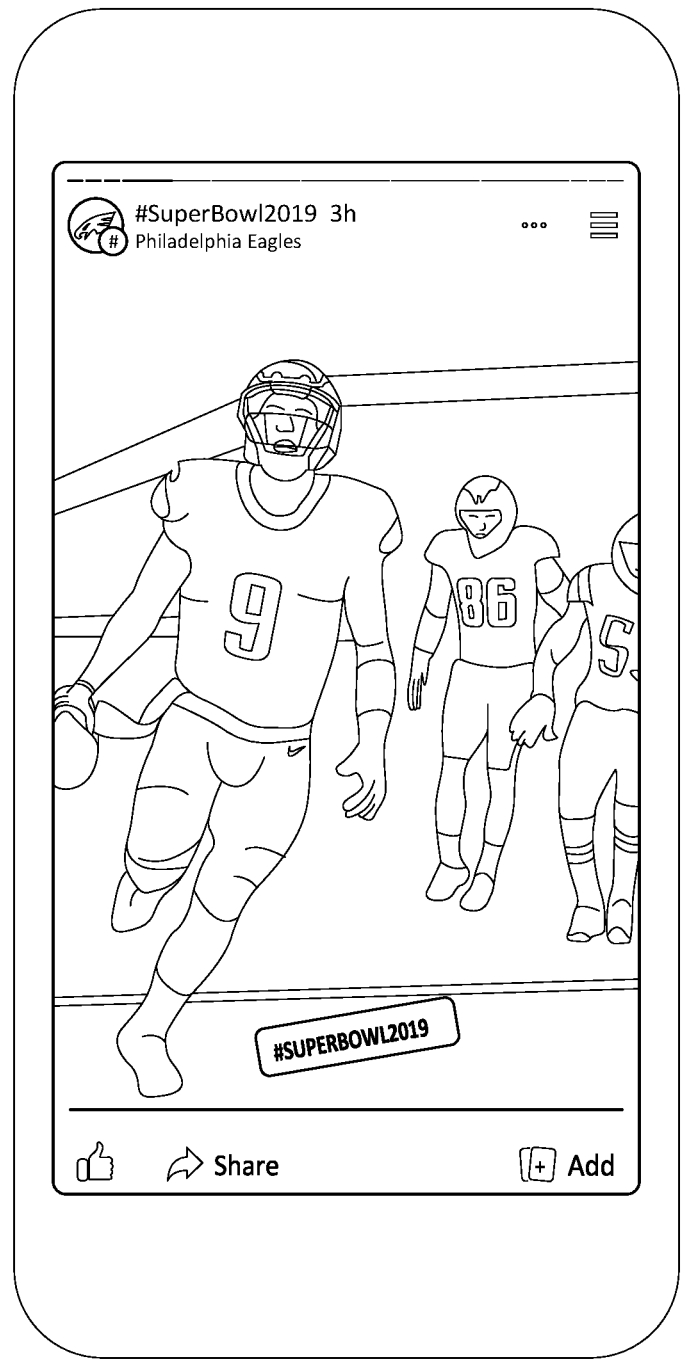
FIG. 9 shows an example user interface, presented to a user by the online system, from which the user can view a channel with a hashtag, in accordance with an embodiment of the invention.

FIG. 9 shows an example user interface, presented to a user by the online system 110, from which the user can view a channel with a hashtag, in accordance with an embodiment of the invention. The user can navigate to view the channel or content associated with the story by interacting with the channel, as is discussed in greater detail in relation to FIGS. 10A-10C.

Channel Navigation

Figure 10C:
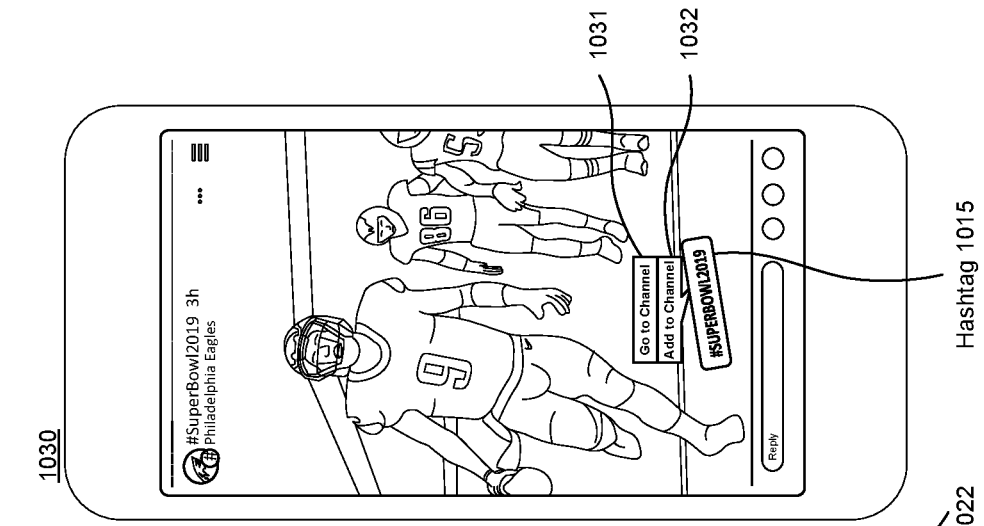
FIGS. 10A-10C show example user interfaces, presented to a user by the online system, from which the user can interact with a channel, in accordance with an embodiment of the invention.
Figure 10B:
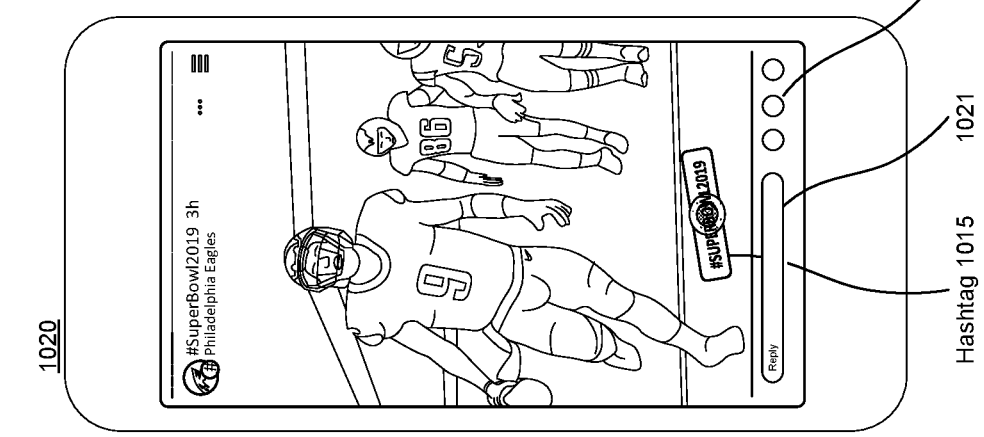
Figure 10A:
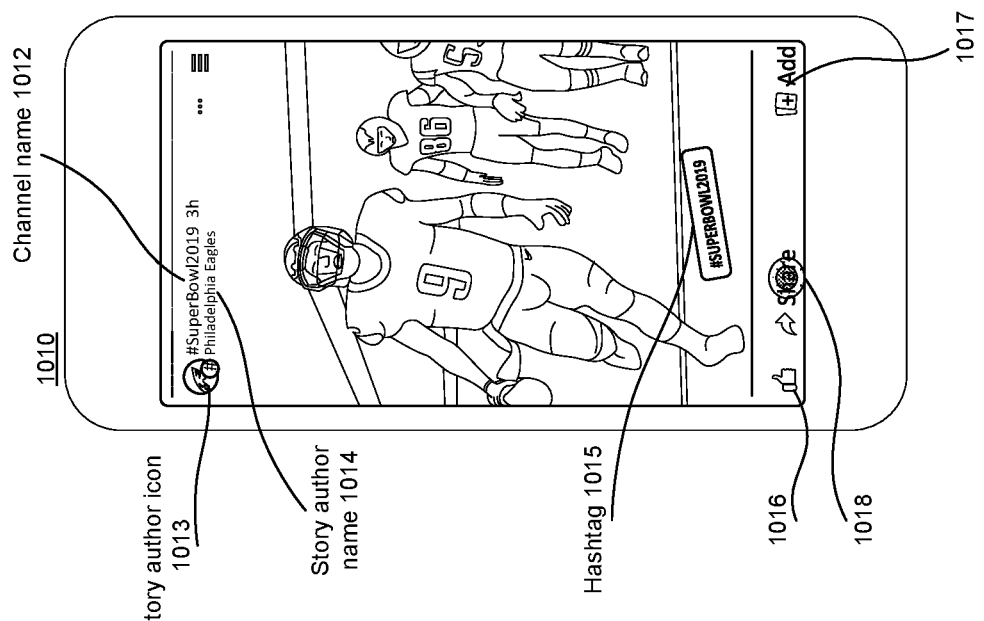

FIGS. 10A-10C show example user interfaces, presented to a user by the online system 110, from which the user can interact with a channel, in accordance with an embodiment of the invention. The interfaces presented in FIGS. 10A-10C are intended to show functionality and do not limit the scope of the present disclosure.

FIG. 10A shows an example of the interface 1010 provided for display on a client device when viewing a channel, according to one embodiment. The channel depicted is the hashtag-associated channel "#SuperBowl2019." The name of the channel 1012 can be found in the provided display. A textual visualization of the hashtag 1015, "#Super-Bowl2019," can also be found in the provided display as part of the visual content of the presently displayed story within the channel. The presently displayed story is authored by the Philadelphia Eagles, as indicated by the circular icon 1013 of the profile picture and name of the story author 1014 beneath the title of the channel at the top left. The circular inset on the profile picture icon 1013 contains a "#" symbol, indicating the channel is a hashtag-associated channel.

From the depicted view of the channel, there are a plurality of options for a viewing user to navigate and interact with the channel and the stories comprised in the channel. For example, tapping on the right side of the display will skip to display the next story on the channel. Similarly, tapping on the left side will re-play the previously displayed story. Tapping on the profile icon 1013 of the author of the presently displayed story navigates to the user profile associated with the author. A viewing user can tap the "Add" icon 1017 at bottom right to add their own story to the channel. A viewing user can also "like" the story using the thumbs up icon 1016 at the bottom left. A viewing user can tap the "Share" icon 1018 next to the thumbs up icon to share the story from the channel to their personal story. A user tapping the share icon 1018 is indicated by the double circle layered on the share icon 1018, as shown in FIG. 10A.

FIG. 10B shows an example of an interface 1020 provided for display on a client device when viewing a story re-shared from a channel on a personal story, according to one embodiment. That is, a user viewing the #SuperBowl2019 channel has re-shared the Philadelphia Eagles story from the #SuperBowl2019 channel to their personal story by navigating to the "Share" icon 1018 and following prompts to share it to their own story. In some embodiments, the user can add additional content to the story when re-sharing it from the channel to their personal story. In some embodiments, the re-shared story contains a visual indication that the story was re-shared from the channel or an attribution of authorship to the original author of the story. As shown in FIG. 10B, the re-shared story contains the visualization of the hashtag 1015 associated with the channel.

The functionality to re-share a story from a channel streamlines and facilitates the sharing of content with other users of the online system 110. For example, the Philadelphia Eagles story depicted is a photo of the team's quarterback scoring a touchdown. Users who are fans of the Eagles who are following the #SuperBowl2019 channel while watching the game can quickly re-share the content from the channel to express their pride in the team to other users. Conventionally, users of the online system 110 who are fans of the Eagles would have to go through the steps of creating their own story to express their pride. This may be unnecessarily time consuming for users who are busy watching the game live, and thereby discourage interaction with the online system 110. Hence, the functionality provided by the channel improves the overall user experience on the online system 110.

A second user who views the story re-shared from the channel can also interact with the content. There are a plurality of interaction and navigation options for the second user. For example, the user can tap the "Reply" field 1021 at the bottom of the re-shared story and send a text reply to the user who re-shared the story (e.g. "Go Eagles!" or "Go Pats!") to interact with the content. In lieu of or in addition to the text response, the second user can send a "reaction" such as "like" or "love" by tapping on the scrollable store of graphic icons 1022 next to the "Reply" field 1021. The second user can tap, select, or otherwise interact with the visualization of the hashtag in the story, as indicated by the double circle layered on the hashtag 1015 in FIG. Responsive to the interaction with the hashtag 1015, the second user may be provided with one or more navigational options.

FIG. 10C shows an example of an interface 1030 provided for display on a client device when viewing a story on a user's personal story, responsive to an interaction with the visual hashtag 1015, according to one embodiment. As depicted in the embodiment in FIG. 10C, the user is presented with two navigational options: "Go to Channel" 1031 or "Add to Channel," 1032. In alternate embodiments, additional or fewer options may be provided to the user.

If the user selects the "Go to Channel" option 1031 then the online system 110 provides for display the story associated with the hashtag "#SuperBowl2019." In a particular example, the interface provided for display to the user subsequent to selecting "Go to Channel" 1031 is the interface 1010 depicted in FIG. 10A.

If the user selects the "Add to Channel" option 1032 then the online system 110 allows the user to create a new story and add the associated hashtag to the new story. This is termed to be adding to a channel "on-context" because the user was viewing content associated with the channel when the user decided to contribute to the channel. The new story can be created in accordance with the embodiment described in relation to FIG. 3. The new story with the associated hashtag is then added to the channel "#SuperBowl2019."

The functionality to be able to add to a channel on-context allows for the channel, and by association the stories comprised within it, go viral. The virality of popular channels facilitates bringing together people with common interests such that content can be shared and enjoyed. Thereby the channel improves the user experience.

Adding Hashtags

FIGS. 11A-11D show example user interfaces, presented to a user by the online system 110, from which the user can select a hashtag, in accordance with an embodiment of the invention. The processes of adding a hashtag as described in relation to FIGS. 11A-11D are known as adding a channel "off-context" wherein the hashtag is added by a selection from a list. This is the conjugate of "on-context" addition wherein the story is added to the channel based on a navigation from the channel itself.

Figure 11B:
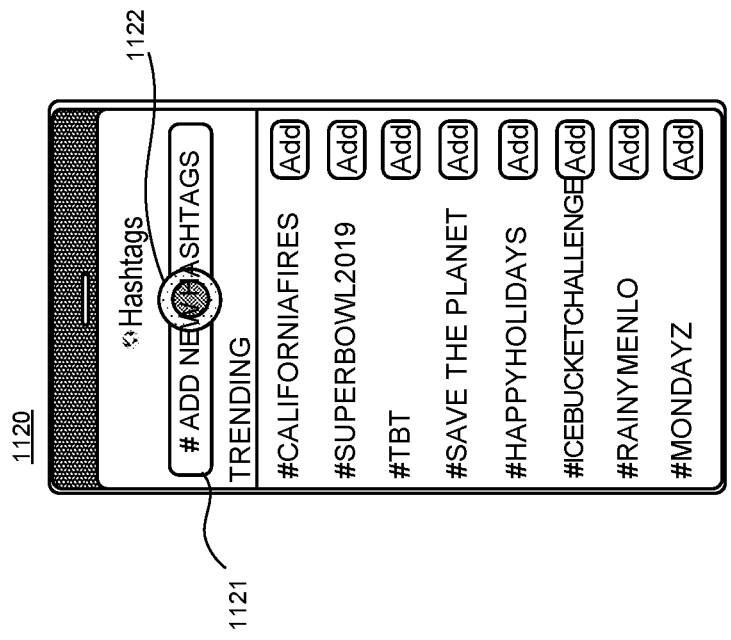
FIGS. 11A-11D show example user interfaces, presented to a user by the online system, from which the user can select a hashtag, in accordance with an embodiment of the invention.
Figure 11A:
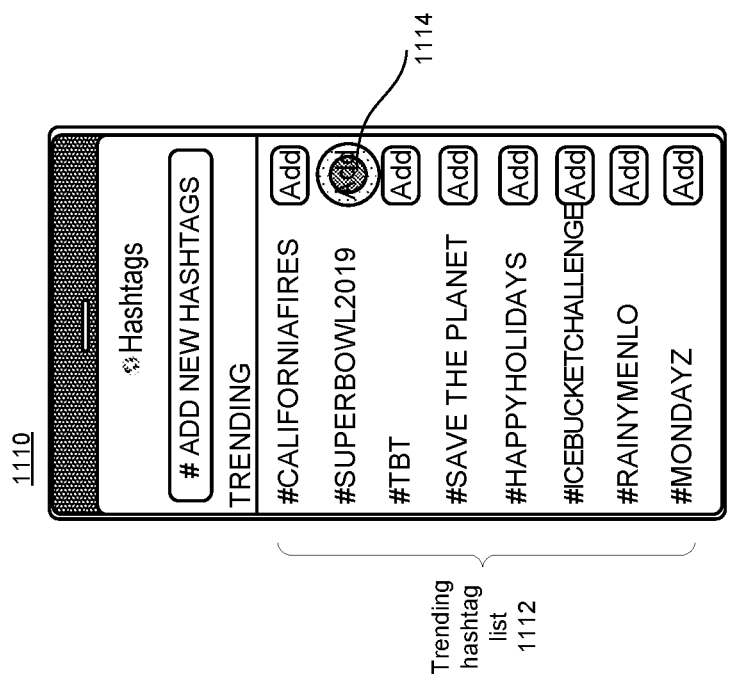

FIG. 11A shows an example user interface 1110 from which user can select a trending hashtag, according to one embodiment. The user can navigate to the interface 1110 while creating a new story, for example by selecting an option to add a hashtag. As show in FIG. 11A, the interface 1110 displays a list of trending hashtags 1112, as may be indicated by the subtitle "Trending" preceding the list of hashtags. The list of trending hashtags 1112 is determined and maintained by the online system 110 and presented for display to the user via the interface 1110 on a client device. For example, the shown list of trending hashtags 1112 includes "#CaliforniaFires," "#SuperBowl2019," and "#TBT." The trending hashtags can be displayed in order of how much they are trending, such that the most popular hashtags are presented at the top of the list 1112. In some embodiments, the list 1112 may be scrollable, such that the user can navigate via scrolling to see more trending hashtags.

In some embodiments, the online system 110 presents a list of "Previously Used" or "Suggested" hashtags. The Previously Used hashtags include hashtags the user has used previously, in particular recently, on other stories. The Suggested hashtags include hashtags suggested to the user based on a plurality of factors that include location, visual content, and historical activity data about the user. In various embodiments, these hashtags may be presented in addition to or instead of the Trending list 1112.

To add one of a hashtag from the Trending list 1112 to the visual content of the story being created, the user can select the hashtag (e.g. tap, click). An example of the selection is indicated in FIG. 11A by the dot overlaid on the "Add" icon 1114 next to the hashtag "#SuperBowl2019." The selection of the hashtag will bring the user back to the interface with the visual content, where a visualization of the selected hashtag has been placed on the visual content. The user can subsequently edit the visualization of the hashtag by changing the position, size, color, font, etc., of the hashtag visualization. The user can also remove the hashtag. When the user is satisfied with the appearance of the visual content, visualization of the hashtag, and any other additional content to be included, the user can post the content and the online system 110 will create the story and provide it for display to users.

By providing the list of Trending hashtags 1112, the user can know what channels are trending, new, or popular in the online system 110 and thereby contribute to them. The user does not need to go and view the trending channels and subsequently add to them on-context. The option to add off-context provides an additional streamlined option for a user to contribute to popular content (e.g. trending channels) on the online system 110.

FIG. 11B shows an example user interface 1120 from which user can search for a new hashtag, according to one embodiment. That is, in addition to selecting a trending hashtag, the user has additional options for adding to a channel off-context. The user can select the search field 1121 and use text query to search for a hashtag to add to their story. The selection is indicated in FIG. 11B by the dot 1122 on the search field 1121 labeled "#Add New Hashtag."

Figure 11D:
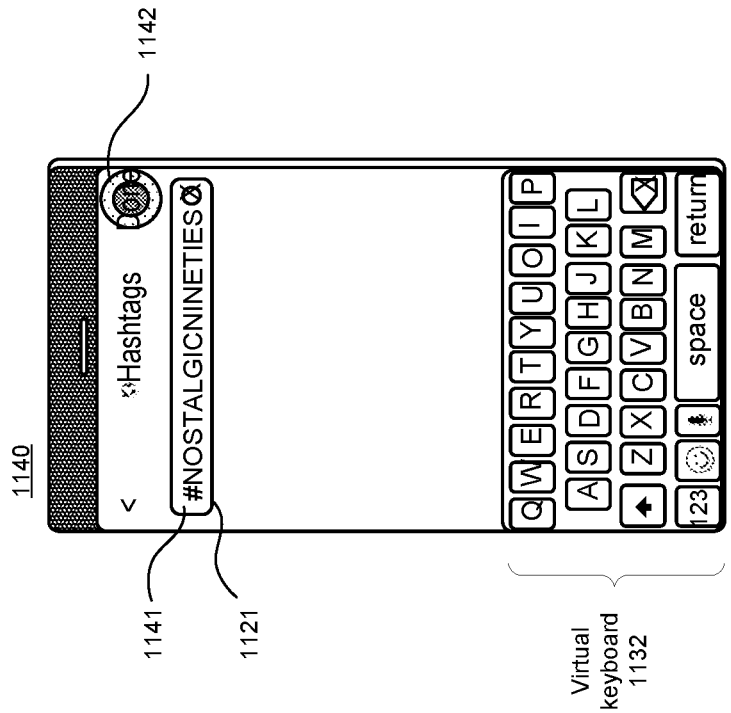
Figure 11C:
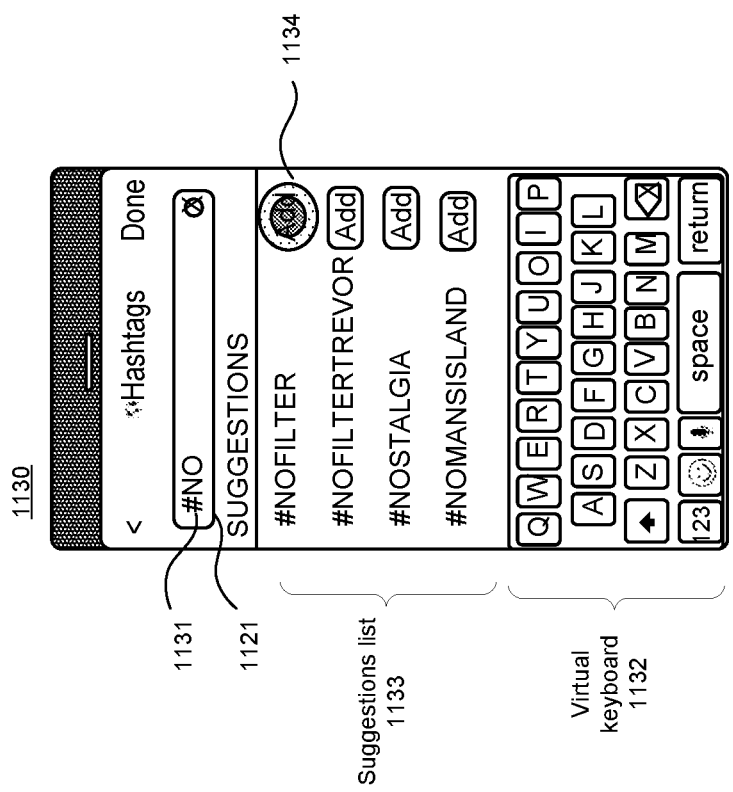

FIG. 11C shows an example user interface 1130 from which a user can use the virtual keyboard 1132 to text search for a new hashtag, according to one embodiment. For example, subsequent to the selection of the search field 1121 depicted in FIG. 11B, a virtual keyboard 1132 is generated for display on the client device and can be used by the user to input text into the search field 1121. In the example shown in FIG. 11C, the user has already input the text "NO" 1131 into the search field. Responsive to the text input 1131 in the search field 1121, the online system 110 has created and provided for display a list of "Suggestions" 1133, as indicated by the subtitle below the search field. The Suggestions 1133 include existing hashtags from the hashtag repository 112 that begin with the text input 1131. The Suggestions 1133 are ordered such that the most relevant hashtags appear at the top. The relevancy of a hashtag can be determined based on how frequently it has been used on the online system, virality (e.g., if currently trending), if the particular user has used the hashtag previously, or a combination thereof.

To add one of a hashtag from the Suggestions list 1133 to the visual content of the story being created, the user can select the hashtag (e.g. tap, click). An example of the selection is indicated in FIG. 11C by the dot on the "Add" icon 1134 next to the hashtag "#NoFilter." The selection of the hashtag will bring the user back to the interface with the visual content, where a visualization of the selected hashtag has been placed on the visual content.

Alternative to selecting one of the hashtags on the Suggestions list 1133, the user can continue adding text to the text input. With each change in the text input, the online system updates the Suggestions list 1133 with existing hashtags matching the text input and ordered by relevance.

FIG. 11D shows an example user interface 1140 from which a user can use the virtual keyboard 1132 to create a new hashtag, according to one embodiment. In the interface 1140 shown in FIG. 11D, the user provided a text input 1141 of "#NostalgiaNineties" to the search field 1121. In this example, the Suggestions has no hashtags because no hashtags that begin with the characters of the text input 1141 are stored in the hashtag repository 112. That is, in this example, the hashtag "#NostalgiaNineties" has not been previously used on the online system 110.

The user can confirm the use of the hashtag contained by the text input 1141 in the search field 1121 by selecting the "Done" icon 1142. The selection of the Done icon 1142 is indicated by the dot over the Done icon 1142 in the top right corner of FIG. 11D. A visualization of the hashtag is then added to the visual content. When the user posts the content, the online system 110 creates a new story and stores it in the story repository 112, a new hashtag to be stored in the hashtag repository 116, and a new channel associated with the hashtag and comprising the story and stores the channel in the channel repository 114.

At any point in the text query in the search field, the user can accept the current text input as the hashtag by tapping the "Done" icon 1142 at the top right. That is, regardless of whether or not there are still hashtags on the Suggestions list 1133, the user can use the hashtag associated with the text contained in the search field 1121.

The processes described for selecting a hashtag in FIGS. 11A-11D can be equally applied to the selection of a sticker.

Example Physical Components

Figure 12:
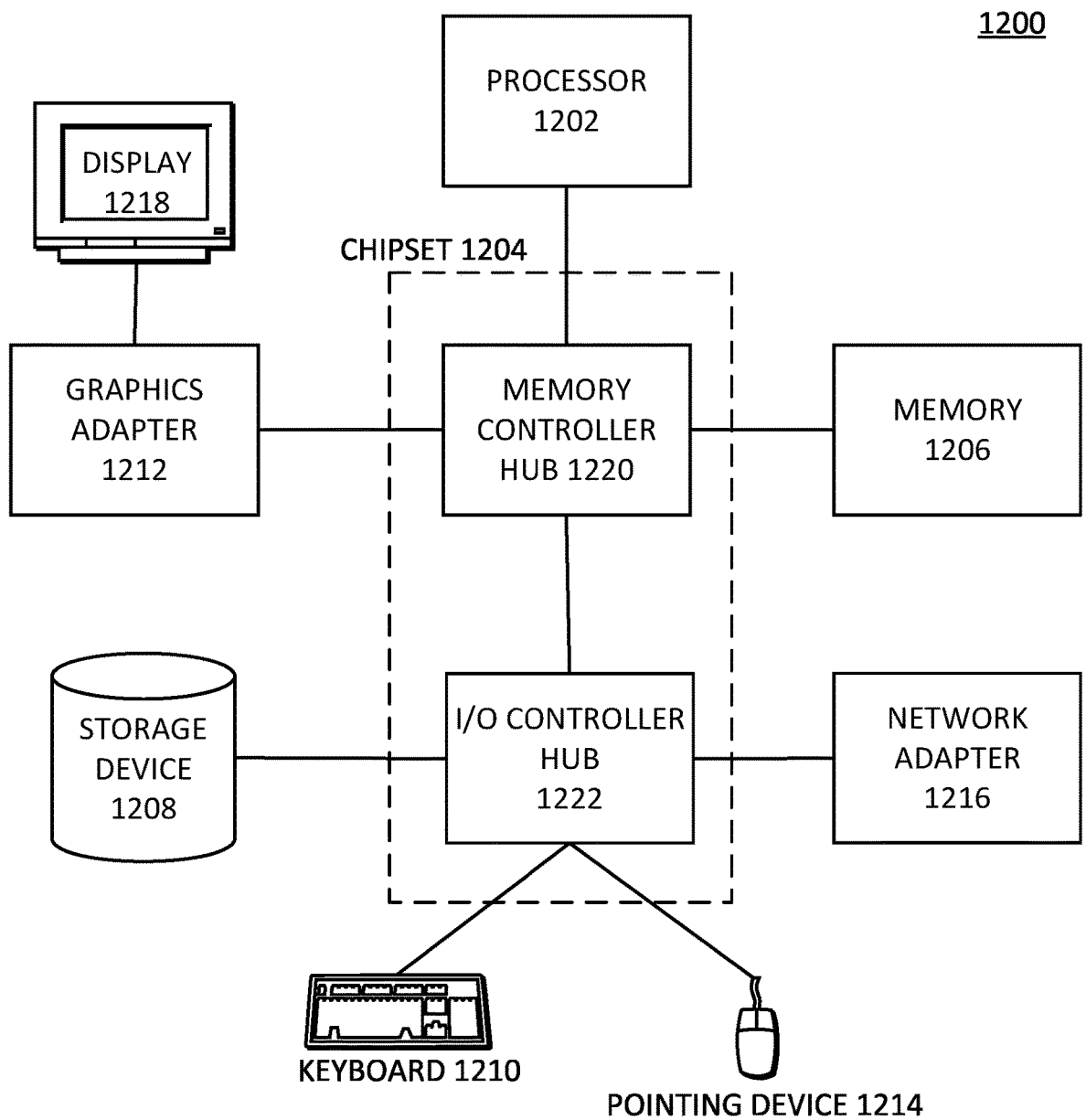
FIG. 12 is a high-level block diagram illustrating physical components of a computer used as part or all of the first client or the plurality of other clients from FIG. 1, according to one embodiment of the invention.

FIG. 12 is a high-level block diagram illustrating physical components of a computer used as part or all of the first client or the plurality of other clients from FIG. 1, according to one embodiment. Illustrated are at least one processor 1202 coupled to a chipset 1204. Also coupled to the chipset 1204 are a memory 1206, a storage device 1208, a graphics adapter 1212, and a network adapter 1216. A display 1218 is coupled to the graphics adapter 1212. In one embodiment, the functionality of the chipset 1204 is provided by a memory controller hub 1220 and an I/O controller hub 1222. In another embodiment, the memory 1206 is coupled directly to the processor 1202 instead of the chipset 1204.

The storage device 1208 is any non-transitory computer-readable storage medium, such as a hard drive, compact disk read-only memory (CD-ROM), DVD, or a solid-state memory device. The memory 1206 holds instructions and data used by the processor 1202. The graphics adapter 1212 displays images and other information on the display 1218. The network adapter 1216 couples the computer 1200 to a local or wide area network.

As is known in the art, a computer 1200 can have different and/or other components than those shown in FIG. 12. In addition, the computer 1200 can lack certain illustrated components. In one embodiment, a computer 1200 acting as a server, or a smartphone, may lack a graphics adapter 1212, and/or display 1218, as well as a keyboard or pointing device. Moreover, the storage device 1208 can be local and/or remote from the computer 1200 (such as embodied within a storage area network (SAN)).

As is known in the art, the computer 1200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1208, loaded into the memory 1206, and executed by the processor 1202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   receiving, by an online system, a request from a user to create a story that is associated with visual content and a time threshold that sets a temporary lifespan of the story;
   receiving a selection from the user of a visual hashtag to add to the story;
   creating a first story with the visual hashtag displayed as a graphic icon on the visual content of the first story;
   providing the first story for display to a viewing user, the first story displaying the visual hashtag;
   receiving an interaction by the viewing user with the graphic icon of the visual hashtag while the first story is playing for the viewing user during a predetermined display time, the interaction indicating a request to add a story with new visual content to the same visual hashtag;
   creating a second story with the visual hashtag displayed on the new visual content as a graphic icon, the second story having a time threshold that sets a temporary lifespan;
   creating a channel associated with the visual hashtag that includes the first story and the second story, wherein, when the channel is played, the channel displays the first story and the second story in a sequential order such that when the first story finishes playing for the predetermined time, the channel automatically switches to playing the second story, the first story available for viewing during the time threshold for the first story and the second story available for viewing during the time threshold for the second story; and providing the channel for display to other users based on the visual hashtag, wherein other users can interact with the visual hashtag to add stories to the channel.

2. The method of claim 1, wherein the visual hashtag is represented as a sticker that includes a graphic depiction of an item relating to a literal meaning of the visual hashtag.

3. The method of claim 1, further comprising:

determining, through object recognition, objects within the visual content of the first story; and, recommending one or more visual hashtags to be displayed on the first story based on the objects.

4. The method of claim 1, further comprising providing to the user a display tray that contains one or more options for visual hashtags from which the user can select to be included on the first story.

5. The method of claim 1, further comprising providing a user interface with a hashtag search field that allows the user to search for a visual hashtag by text search and select the visual hashtag.

6. The method of claim 5, further comprising, in response to the text search returning no visual hashtags in the search results, providing a user interface with a visual hashtag creation field that allows the user to create a new visual hashtag.

7. The method of claim 1, further comprising:

providing the channel with the visual hashtag for display to a third viewing user;

receiving an indication that the third viewing user has selected the visual hashtag from the first or second story in the channel;

receiving a request from the third viewing user to add a new story to the channel with new visual content and the same visual hashtag; and adding the new story to the channel.

8. The method of claim 1, further comprising:

receiving a request from a third user to create a new story;

receiving a request from the third user to include the visual hashtag, wherein the visual hashtag was selected from a text search by the third user, and wherein the addition of the visual hashtag makes the new story public; and adding the new story with the visual hashtag to the channel associated with the visual hashtag.

9. The method of claim 1, further comprising:

receiving a request from a third user to create a new story;

receiving at least part of a text post on the new story comprising at least a pound (#) symbol;

providing one or more suggested visual hashtags to include on the story based on trending visual hashtags or visual hashtags previously used the by third user;

receiving a selection of a visual hashtag from the third user; and adding the new story with the selected visual hashtag to a channel associated with the selected visual hashtag.

10. The method of claim 1, wherein, in response to the interaction by the viewing user with the graphic icon of the visual hashtag, further comprising:

providing to the viewing user one or more navigational options to choose from, including a navigational option to add a story with new visual content to the same visual hashtag, wherein the one or more navigational options were displayed on the first story while the first story was playing for the viewing user during the pre-determined display time; and in response to the viewing user selecting the navigational option to add a story, creating the second story.

11. A non-transitory computer-readable storage medium storing instructions for execution on a computer processor, the instructions when executed performing actions comprising:

receiving, by an online system, a request from a user to create a story that is associated with visual content and a time threshold that sets a temporary lifespan of the story;

receiving a selection from the user of a visual hashtag to add to the story;

creating a first story with the visual hashtag displayed as a graphic icon on the visual content of the first story;

providing the first story for display to a viewing user, the first story displaying the visual hashtag;

receiving an interaction by the viewing user with the graphic icon of the visual hashtag while the first story is playing for the viewing user during a predetermined display time, the interaction indicating a request to add a story with new visual content to the same visual hashtag;

creating a second story with the visual hashtag displayed on the new visual content as a graphic icon, the second story having a time threshold that sets a temporary lifespan;

creating a channel associated with the visual hashtag that includes the first story and the second story, wherein, when the channel is played, the channel displays the first story and the second story in a sequential order such that when the first story finishes playing for the predetermined time, the channel automatically switches to playing the second story, the first story available for viewing during the time threshold for the first story and the second story available for viewing during the time threshold for the second story; and providing the channel for display to other users based on the visual hashtag, wherein other users can interact with the visual hashtag to add stories to the channel.

12. The non-transitory computer-readable storage medium of claim 11, wherein the visual hashtag is represented as a sticker that includes a graphic depiction of an item relating to a literal meaning of the visual hashtag.

13. The non-transitory computer-readable storage medium of claim 11, further comprising instructions for execution on a computer processor, the instructions when executed performing actions comprising:

determining, through object recognition, objects within the visual content of the first story; and, recommending one or more visual hashtags to be displayed on the first story based on the objects.

14. The non-transitory computer-readable storage medium of claim 11, further comprising instructions for execution on a computer processor, the instructions when executed performing actions comprising providing to the user a display tray that contains one or more options for visual hashtags from which the user can select to be included on the first story.

15. The non-transitory computer-readable storage medium of claim 11, further comprising instructions for execution on a computer processor, the instructions when executed performing actions comprising providing a user interface with a hashtag search field that allows the user to search for a visual hashtag by text search and select the visual hashtag.

16. The non-transitory computer-readable storage medium of claim 15, further comprising instructions for execution on a computer processor, the instructions when executed performing actions comprising in response to the text search returning no visual hashtags in the search results, providing a user interface with a visual hashtag creation field that allows the user to create a new visual hashtag.

17. The non-transitory computer-readable storage medium of claim 11, further comprising instructions for execution on a computer processor, the instructions when executed performing actions comprising:
provuiding the channel with the visual hashtag for display to a third viewing user;
receiving an indication that the third viewing user has selected the visual hashtag from the first or second story in the channel;
receiving a request from the third viewing user to add a new story to the channel with new visual content and the same visual hashtag; and
adding the new story to the channel.

18. The non-transitory computer-readable storage medium of claim 11, further comprising instructions for execution on a computer processor, the instructions when executed performing actions comprising:
receiving a request from a third user to create a new story;
receiving a request from the third user to include the visual hashtag, wherein the visual hashtag was selected from a text search by the third user, and wherein the addition of the visual hashtag makes the new story public; and
adding the new story with the visual hashtag to the channel associated with the visual hashtag.

19. The non-transitory computer-readable storage medium of claim 11, further comprising instructions for execution on a computer processor, the instructions when executed performing actions comprising:
receiving a request from a third user to create a new story;
receiving at least part of a text post on the new story comprising at least a pound (#) symbol;
providing one or more suggested visual hashtags to include on the story based on trending visual hashtags or visual hashtags previously used the by third user;
receiving a selection of a visual hashtag from the third user; and
adding the new story with the selected visual hashtag to a channel associated with the selected visual hashtag.

20. The non-transitory computer-readable storage medium of claim 11, wherein, in response to the interaction by the viewing user with the graphic icon of the visual hashtag, the instructions further comprise:
providing to the viewing user one or more navigational options to choose from, including a navigational option to add a story with new visual content to the same visual hashtag, wherein the one or more navigational options were displayed on the first story while the first story was playing for the viewing user during the pre-determined display time; and
in response to the viewing user selecting the navigational option to add a story, creating the second story.

* * * * *